(12) United States Patent
Wobben

(10) Patent No.: US 7,946,803 B2
(45) Date of Patent: May 24, 2011

(54) ROTOR BLADE FOR A WIND POWER SYSTEM

(76) Inventor: Aloys Wobben, Aurich (DE)

( * ) Notice: Subject to any disclaimer, the term of this patent is extended or adjusted under 35 U.S.C. 154(b) by 948 days.

(21) Appl. No.: 10/554,628

(22) PCT Filed: Mar. 29, 2004

(86) PCT No.: PCT/EP2004/003294
§ 371 (c)(1),
(2), (4) Date: Oct. 2, 2006

(87) PCT Pub. No.: WO2004/097215
PCT Pub. Date: Nov. 11, 2004

(65) Prior Publication Data
US 2007/0036657 A1    Feb. 15, 2007

(30) Foreign Application Priority Data

Apr. 28, 2003  (DE) .................. 103 19 246

(51) Int. Cl.
*F03D 1/06* (2006.01)
(52) U.S. Cl. ............ 415/4.3; 416/132 B; 416/243
(58) Field of Classification Search .......... 415/4.1, 415/4.3, 4.5; 416/41, 84, 132 B, 234, 239, 416/243, DIG. 5
See application file for complete search history.

(56) References Cited

U.S. PATENT DOCUMENTS

| | | | |
|---|---|---|---|
| 1,403,069 A | 1/1922 | Burne | |
| 2,400,388 A | 5/1946 | Campbell | |
| 2,428,936 A | 10/1947 | Hunter | |
| 2,442,783 A | 6/1948 | Senn | |
| 2,453,403 A | 11/1948 | Bogardus | |
| 2,465,007 A | 3/1949 | Bragdon et al. | |
| 2,485,543 A * | 10/1949 | Andreau | 60/398 |
| 2,616,509 A | 11/1952 | Thomas | |
| 2,622,686 A | 12/1952 | Chevreau et al. | |
| 2,934,150 A | 4/1960 | Fink | |
| 3,184,187 A | 5/1965 | Isaac | |
| 3,463,420 A | 8/1969 | Butler et al. | |
| 3,874,816 A | 4/1975 | Sweeney et al. | |
| 3,987,984 A | 10/1976 | Fischer | |

(Continued)

FOREIGN PATENT DOCUMENTS

DE     31 26 677 A1    1/1983

(Continued)

OTHER PUBLICATIONS

Machine Translation of WO 02/051730 A2, from EPO website, retrieved Sep. 17, 2009.*

(Continued)

*Primary Examiner* — Nathaniel Wiehe
(74) *Attorney, Agent, or Firm* — Seed IP Law Group PLLC

(57) ABSTRACT

The invention pertains to a rotor blade for a wind power system as well as a wind power system. The present invention is based on the objective of disclosing a rotor blade with a rotor blade profile and a corresponding wind power system that make it possible to improve the efficiency in comparison with arrangements known thus far. In the proposed rotor blade for a wind power system, the position of maximum thickness of the rotor blade lies approximately between 15% and 40%, preferably between 23% and 28%, and the maximum profile thickness lies approximately between 20% and 45%, preferably between 32% and 36%.

22 Claims, 22 Drawing Sheets

U.S. PATENT DOCUMENTS

| | | | |
|---|---|---|---|
| 4,247,253 A | 1/1981 | Seki et al. | |
| 4,274,011 A | 6/1981 | Garfinkle | |
| 4,408,958 A | 10/1983 | Schacle | |
| 4,419,053 A | 12/1983 | Swearingen, Jr. | |
| 4,498,017 A | 2/1985 | Parkins | |
| 4,519,746 A | 5/1985 | Wainauski et al. | |
| 4,613,760 A | 9/1986 | Law | |
| 4,692,095 A | 9/1987 | Lawson-Tancred | |
| 4,699,568 A | 10/1987 | Harlamert et al. | |
| 4,732,542 A | 3/1988 | Hahn et al. | |
| 4,773,824 A | 9/1988 | Kiss | |
| 4,773,825 A | 9/1988 | Rodde et al. | |
| 4,830,574 A | 5/1989 | Wainauski et al. | |
| 4,976,587 A * | 12/1990 | Johnston et al. | 416/230 |
| 5,096,378 A | 3/1992 | Jamieson | |
| 5,106,265 A | 4/1992 | Holzem | |
| 5,320,491 A | 6/1994 | Coleman et al. | |
| 5,417,548 A | 5/1995 | Tangler et al. | |
| 5,474,425 A | 12/1995 | Lawlor | |
| 5,527,151 A * | 6/1996 | Coleman et al. | 416/23 |
| 5,562,420 A | 10/1996 | Tangler et al. | |
| 5,570,859 A | 11/1996 | Quandt | |
| 5,570,997 A | 11/1996 | Pratt | |
| 6,015,115 A | 1/2000 | Dorsett et al. | |
| 6,068,446 A | 5/2000 | Tangler et al. | |
| 6,133,716 A | 10/2000 | Schutten | |
| 6,420,795 B1 | 7/2002 | Mikhail et al. | |
| 6,465,902 B1 * | 10/2002 | Beauchamp et al. | 290/55 |
| 6,503,058 B1 | 1/2003 | Selig et al. | |
| 6,523,781 B2 | 2/2003 | Ragner | |
| 6,682,302 B2 | 1/2004 | Noble | |
| 6,951,443 B1 | 10/2005 | Blakemore | |
| 7,204,674 B2 | 4/2007 | Wobben | |
| 7,357,624 B2 * | 4/2008 | Wobben | 416/132 B |
| D584,686 S * | 1/2009 | Gudewer | D13/115 |
| 7,708,530 B2 | 5/2010 | Wobben | |
| 2003/0099546 A1 | 5/2003 | Stiesdal et al. | |
| 2004/0105752 A1 | 6/2004 | Wobben | |
| 2007/0297896 A1 * | 12/2007 | Wobben | 415/130 |
| 2007/0297909 A1 * | 12/2007 | Wobben | 416/223 R |

FOREIGN PATENT DOCUMENTS

| | | |
|---|---|---|
| DE | 4002972 C2 | 8/1991 |
| DE | 44 28 731 A1 | 2/1996 |
| DE | 44 35 606 A1 | 4/1996 |
| DE | 197 19 221 C1 | 10/1998 |
| DE | 69415292 T2 | 7/1999 |
| EP | 0 283 730 A1 | 9/1988 |
| EP | 375382 A2 | 6/1990 |
| FR | 908 631 | 4/1946 |
| FR | 2290585 | 6/1976 |
| FR | 2 587 675 A1 | 3/1987 |
| GB | 2311978 A | 10/1997 |
| JP | 55153870 A | 12/1980 |
| JP | 5189146 | 7/1993 |
| SU | 577300 | 11/1977 |
| SU | 1539378 A | 1/1990 |
| WO | 00/73651 | 12/2000 |
| WO | 01/55590 | 8/2001 |
| WO | 200183983 A1 | 11/2001 |
| WO | 2002051730 A2 | 7/2002 |
| WO | WO 02/051730 A2 * | 7/2002 |
| WO | 03/104646 | 12/2003 |
| WO | 2003104646 A1 | 12/2003 |

OTHER PUBLICATIONS

Timmer, W. A., et al., "Thick Airfoils for HAWT's," Journal of Wind Engineering and Industrial Aerodynamics, vol. 39, Amsterdam, Netherlands, 1992, pp. 151-160.

Wortmann, "FX77W343", Nihon University Aero Student Group, NASG Airfoil Database, XP002253850, http://www.nasg.com/, download date of Oct. 2, 2006.

Bjorck, Anders, "Coordinates and Calculations for the FFA-W1-xxx, FFA-W2-xxx and FFA-W3-xxx Series of Airfoils for Horizontal Axis Wind Turbines," The Aeronautical Research Institute of Sweden, 1990, 150 pages, Stockholm, Sweden.

Tettman, Ray, "Statement of Grounds and Particulars," in re: Vestas Wind Systems A/S of Randers, Denmark, Comments in Support of Notice of Opposition to Australian Patent Application No. 2003237707, Jul. 10, 2008, pages 1-6, Hawthorn, Australia.

* cited by examiner

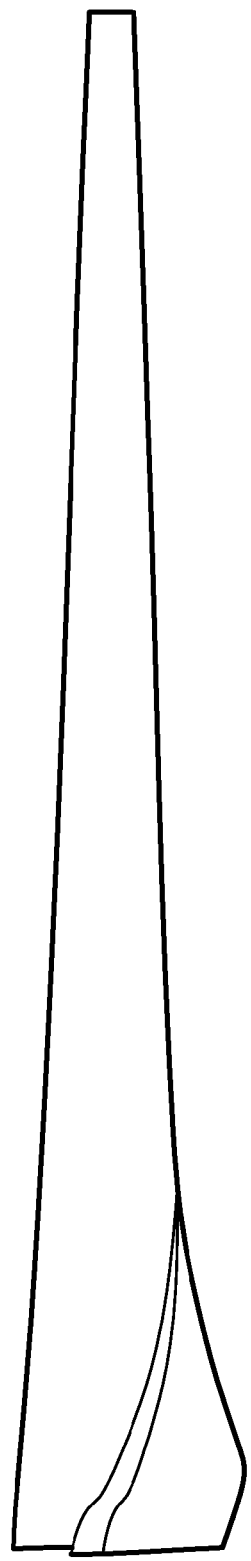 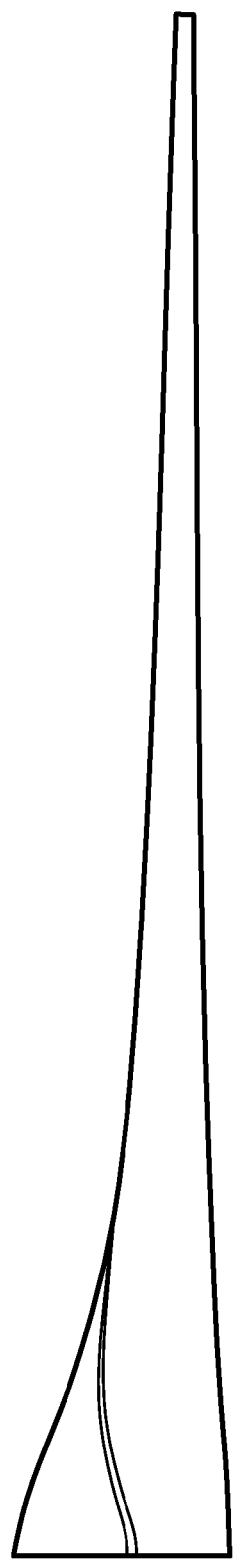 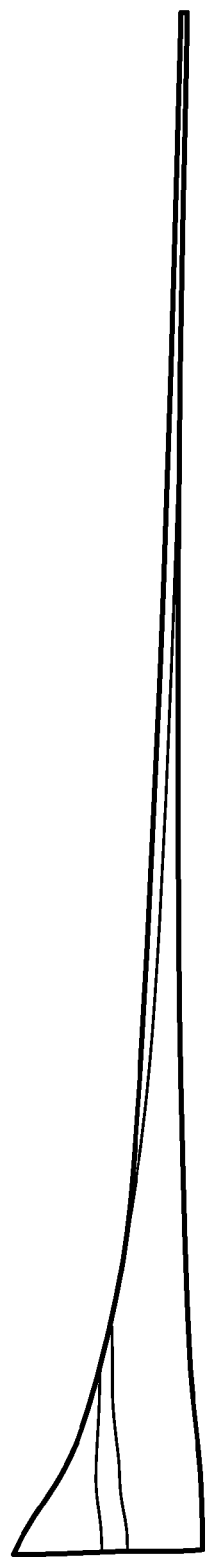
*FIG.4*   *FIG.5*   *FIG.6*

ROTOR BLADE FOR A WIND POWER SYSTEM

TECHNICAL FIELD

The invention pertains to a rotor blade for a wind power system and to a corresponding wind power system.

BACKGROUND INFORMATION

With respect to the pertinent state of the art, we refer to the book "Windkraftanlagen" [Wind power systems] by Erich Hau, 1996. This book contains a few examples of wind power systems, rotor blades for such wind power systems as well as cross sections through rotor blades according to the state of the art. The geometric profile parameters of aerodynamic profiles according to NACA are illustrated in FIG. 5.34 on page 102. According to this illustration, the rotor blade is described by a profile depth that corresponds to the length of the chord, a maximum camber (or camber ratio) that defines the maximum height of the skeleton line above the chord, a position of maximum camber, i.e., the location of the maximum camber within the cross section of the rotor blade relative to the profile depth, the maximum profile thickness that defines the maximum diameter of an inscribed circle, the center of which lies on the skeleton line, and the position of maximum thickness, i.e., the location at which the cross section of the rotor blade assumes its maximum profile thickness relative to the profile depth. In addition, the leading edge radius as well as the profile coordinates of the lower and upper side are used for describing the cross section of the rotor blade. The nomenclature from the book by Erich Hau, inter alia, is also used for the description of the cross section of a rotor blade according to the present invention.

Other rotor blades according to the state of the art are disclosed in DE 103 07 682, U.S. Pat. No. 5,474,425, U.S. Pat. No. 6,068,446 and DE 694 15 292.

The optimization of rotor blades can be realized in terms of several different aspects. The rotor blades should not only operate quietly, but also have a maximum dynamic performance in order to initiate the rotation of the wind power system at relatively low wind velocities and to reach nominal velocity, i.e., the velocity at which the nominal power of the wind power system is reached for the first time, at the lowest wind strength possible. If the wind velocity subsequently increases, it is now common practice to increase the adjustment of the rotor blades of pitch-regulated wind power systems into the wind such that nominal power is maintained while the surface area of the rotor blade exposed to the wind decreases in order to protect the entire wind power system and its parts from mechanical damage. In any case, the aerodynamic properties of the rotor blade profiles of the rotor blade of a wind power system are of the utmost importance.

BRIEF SUMMARY OF THE INVENTION

The present invention is based on the objective of disclosing a rotor blade with a rotor blade profile and a corresponding wind power system that make it possible to improve the efficiency in comparison with rotor blades known thus far.

According to the invention, this objective is realized with a rotor blade that has a rotor blade profile according to the embodiments disclosed herein. Advantageous additional developments are also disclosed herein.

BRIEF DESCRIPTION OF THE SEVERAL VIEWS OF THE DRAWINGS

The invention is described below with reference to several figures. The individual figures show:

FIGS. 4-8, views of a rotor blade according to the invention from different directions;

DETAILED DESCRIPTION

In the following description, certain specific details are set forth in order to provide a thorough understanding of various embodiments. However, one skilled in the art will understand that the present systems and methods may be practiced without these details. In other instances, well-known structures, protocols, and other details have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

The rotor blade profile described in the present application is situated, in particular, in the region of the rotor blade that lies adjacent to the rotor blade mount (the connection to the hub). The profile described in the present application is preferably located in the first third of the rotor blade relative to its total length. Depending on the nominal power of the wind power system, these blades have a total length between 10 m and 70 m. For example, a wind power system of the Enercon E-112 type (diameter approximately 112 m) has a nominal power of 4.5 MW while a wind power system of the Enercon E-30 type has a nominal power of 300 kW.

Figure 18:
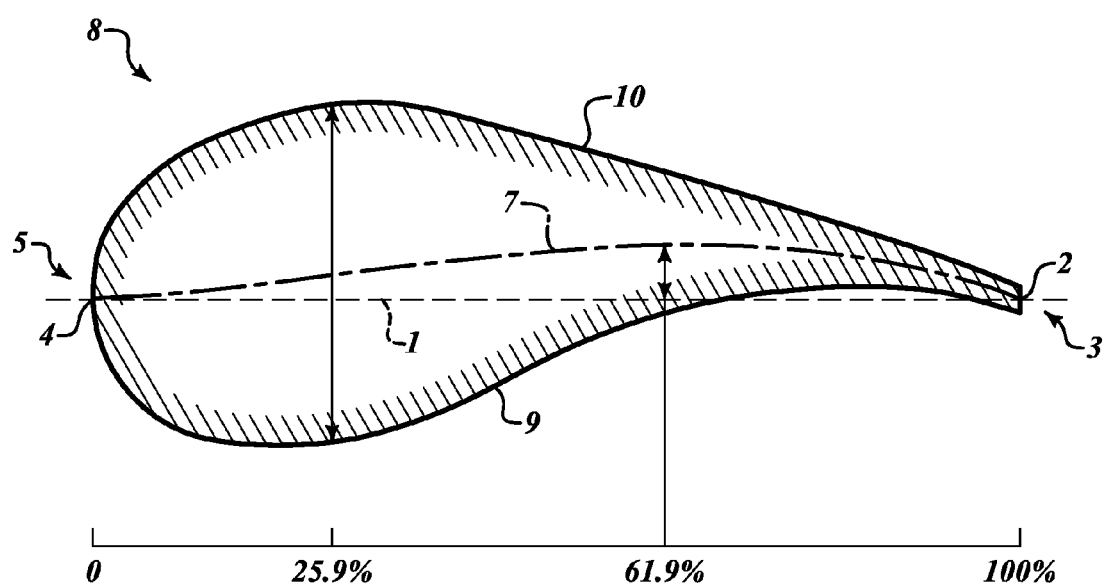

One particular characteristic of the profile of the rotor blade according to the invention is that the maximum profile thickness is approximately 25%-40% of the rotor blade chord length, preferably 32%-36%. In FIG. 18, the maximum profile thickness is approximately 34.6% of the rotor blade chord length. The chord 1 shown in FIG. 18 extends from the center 2 of the trailing rotor blade edge 3 to the extreme point 4 of the rotor blade tip 5. The position of maximum thickness, i.e., the location of the maximum profile thickness relative to the blade length, is approximately 20%-30% of the chord length, preferably 23%-28%. In the embodiment shown, the position of maximum thickness is 25.9%. The maximum thickness was determined perpendicular to the chord 1, and the maximum position is relative to the rotor blade tip 5.

FIG. 18 also shows a so-called skeleton line 7. This skeleton line 7 respectively defines half the thickness of the rotor blade 8 at any given point. Accordingly, this skeleton line 7 is not straight, but rather positioned exactly between opposite points on the pressure side 9 of the rotor blade 8 and the suction side 10 of the rotor blade 8. The skeleton line 7 intersects the chord 1 at the trailing rotor blade edge 3 and the rotor blade tip 5.

The position of maximum camber in the cross section of the rotor blade according to the invention is approximately 55%-70% of the chord length, preferably 59%-63%. The position of maximum camber in the embodiment shown is approximately 61.9%. The maximum camber in this case is approximately 4%-8% of the chord length, preferably 5%-7% of the chord length. In the embodiment shown, the camber is approximately 5.87% of the chord length.

Another obvious peculiarity of the profile of the rotor blade 8 according to the invention is that the pressure side 9 of the rotor blade "intersects" the chord 1 twice. Therefore, the pressure side 9 of the profile is realized concavely in this region while the pressure side 9 is realized convexly in the front profile region. In the concave region of the pressure side 9, the suction side 10 is limited by a nearly straight line in the correspondingly opposite region on the suction side 10.

It may well have been known to realize the pressure side 9 with a concave camber or to realize the suction side 10 with a straight boundary. However, the combination of both measures, in particular, is of the utmost importance for the profile of a rotor blade according to the invention and characteristic for the rotor blade profile according to the invention.

The trailing rotor blade edge 3 of the profile shown is also conspicuously thick. However, this not problematic with respect to the development of noise on the trailing rotor blade edge 3 because the profile shown is arranged within the inner third of the circle defined by the rotor blade tip and the path velocity is not very high at this location.

The aerodynamic shape of the rotor blade can be improved by designing the region of the rotor blade root in such a way that the rotor blade has here its maximum thickness and thus the rotor blade is approximately trapezoidal (in a plan view) that more or less resembles the optimal aerodynamic shape. In the region of its root, the rotor blade is preferably realized in such a way that the edge of the rotor blade root which faces the nacelle of the wind power system is adapted to the outside contour of the nacelle in at least one angular position, for example, adapted such that a very small gap with a width of approximately 5 mm-100 mm is formed between the edge of the rotor blade root that faces the wind power system and the outside contours of the nacelle when the rotor blade is in its nominal wind position.

It was determined that a rotor blade with the aforementioned characteristics makes it possible to significantly increase the power, namely, by up to 10% in certain cases. Due to this unforeseen increase in power, the power output of a wind power system according to the invention is increased at any given wind velocity below the nominal wind velocity. In addition, the wind power system reaches its nominal power more quickly than before. This means that the rotor blades can also be turned (pitched) earlier in order to reduce the sound emission as well as the mechanical stress on the system.

The invention is based on the idea that the conventional rotor blade shape in use today is tested in the wind tunnel at different wind velocities but with a uniform air flow. However, since natural wind rarely blows so uniformly and is subject to stochastic laws, wind gusts may cause separation of the flow in conventional rotor blades, particularly in the inner blade region near the rotor hub where the blade is no longer realized in an aerodynamically clean and optimal fashion. The flow separation continues over a certain distance in the direction of the outer rotor blade region (rotor blade tip). This may lead to flow separation in a bubble-shaped region and a consequent loss of power. Due to the clean design of the rotor blade, the invention also makes it possible to increase the power significantly in the inner rotor blade region in the case of the above-described type.

If a conventional standard profile were used instead of the empirically determined profile proposed by the present application, an aerodynamically clean design of the rotor blade would require approximately twice the profile depth (that corresponds to the chord length of the rotor blade) in the lower rotor blade region (the region near the hub). The significant profile thickness in the front region, however, is required for a safe load transfer and for reaching a lift coefficient $C_A$ greater than 2.

State-of-the-art rotor blades are now routinely manufactured in such a way that a maximum material savings is achieved in the inner region. Typical examples of such state-of-the-art rotor blades are shown on pages 114 and 115 in the above-cited "Windkraftanlagen" by Erich Hau, 1996. According to these examples, the maximum profile depth is always reached a certain distance from the rotor blade mount, i.e., near the rotor blade mounting region, wherein material is saved in these rotor blades according to the state of the art. However, when using an optimal shape that resembles a trapezoid in a plan view, the maximum width of the rotor blade is not located a certain distance from the rotor blade mount, but exactly in the region of the rotor blade mount itself. Consequently, here a maximum material saving cannot be achieved in the inner region of the rotor blades.

The reason for the material savings can be seen in the (above-described) static consideration of the flow conditions in the calculation/development of the rotor blades. In addition, popular calculation programs for rotor blades divide the rotor blade into individual sections and calculate each rotor blade section individually in order to derive the evaluation of the entire rotor blade.

However, the actual conditions are quite different. First, the wind does not blow in a uniform and static fashion within a certain surface area, but rather exhibits a distinct stochastic behavior. Second, the wind velocity is a significant factor due to the slow peripheral velocity of the rotor blade in the inner region (i.e., in the region near the rotor hub) such that the change in the angle of attack is highly dependent on the instantaneous wind velocity in this region. Consequently, boundary layer separations also occur with a corresponding frequency in the inner region of the rotor blade.

Hysteresis is effective in such cases. Once the wind calms to the prior wind velocity, e.g., after a wind gust, the boundary layer on the rotor blade is not only not immediately restored, but the wind velocity must initially decrease further (i.e., the angle of attack needs to be further adjusted) until the boundary layer on the rotor blade surface is restored. However, if the wind velocity does not decrease further, it may very well be that a certain force is exerted on the rotor blade for an extended period of time despite the incident wind because the boundary layer on the rotor blade surface is not yet restored.

The design of the rotor blade in accordance with the invention significantly reduces the risk of a boundary layer separation. This risk of separation is also reduced with the aid of the relatively thick profile. Another explanation for the substantial increase in efficiency is that the hysteresis effect causes the decreased power output to persist for a significant period of time (when state-of-the-art rotor blades are used) once a boundary layer separation has occurred.

The increased efficiency can also be partly explained in that the wind utilizes the path of least resistance. A very thin design of the rotor blade in the inner region near the hub (significant material savings) is equivalent to a "slip hole" in the rotor circle harvesting area swept out by the rotor blade, whereby the air prefers to flow through this slip hole. This is another indicator of a weakness of popular calculation programs that always base calculations on a uniform distribution over the circular area swept out by the rotor blades.

If this "slip hole" is "closed" by utilizing a rotor blade of trapezoidal design in the region near the hub, the distribution of the air flow is improved over the entire circular area and the effect on the outer region of the motor blade is somewhat intensified. Consequently, the "closing" of this "slip hole" contributes to the improved power coefficient of the rotor blade according to the invention.

This also indicates yet another weakness of popular calculation programs because they also consider the rotor blade section located directly adjacent to the "slip hole" as a fully functional rotor blade section. However, this cannot be the case due to the special flow conditions (frequent boundary layer separations followed by the restoration of the intended flow conditions).

FIGS. 11-17 respectively show a front view and a side view of a wind power system according to the invention. In these figures, the three rotor blades transition into the outside contours of the nacelle nearly seamlessly in the region near the hub. However, this only applies to the position of the rotor blades that corresponds to the nominal wind position.

Figure 15:
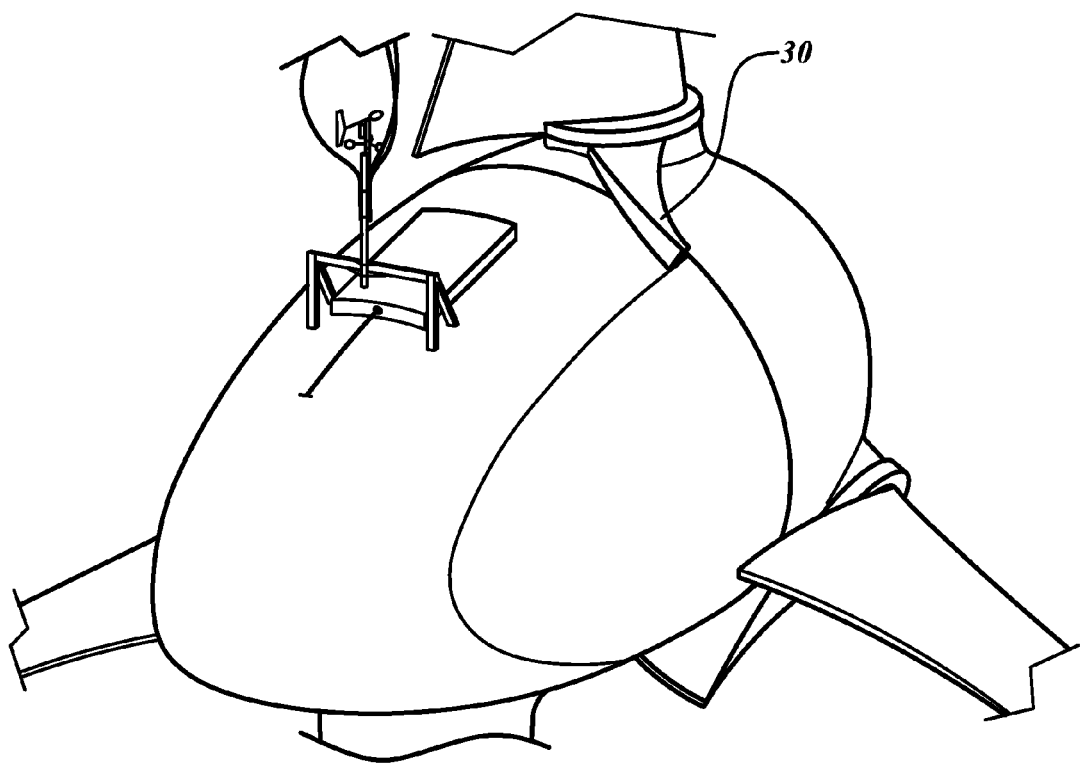
Figure 16:
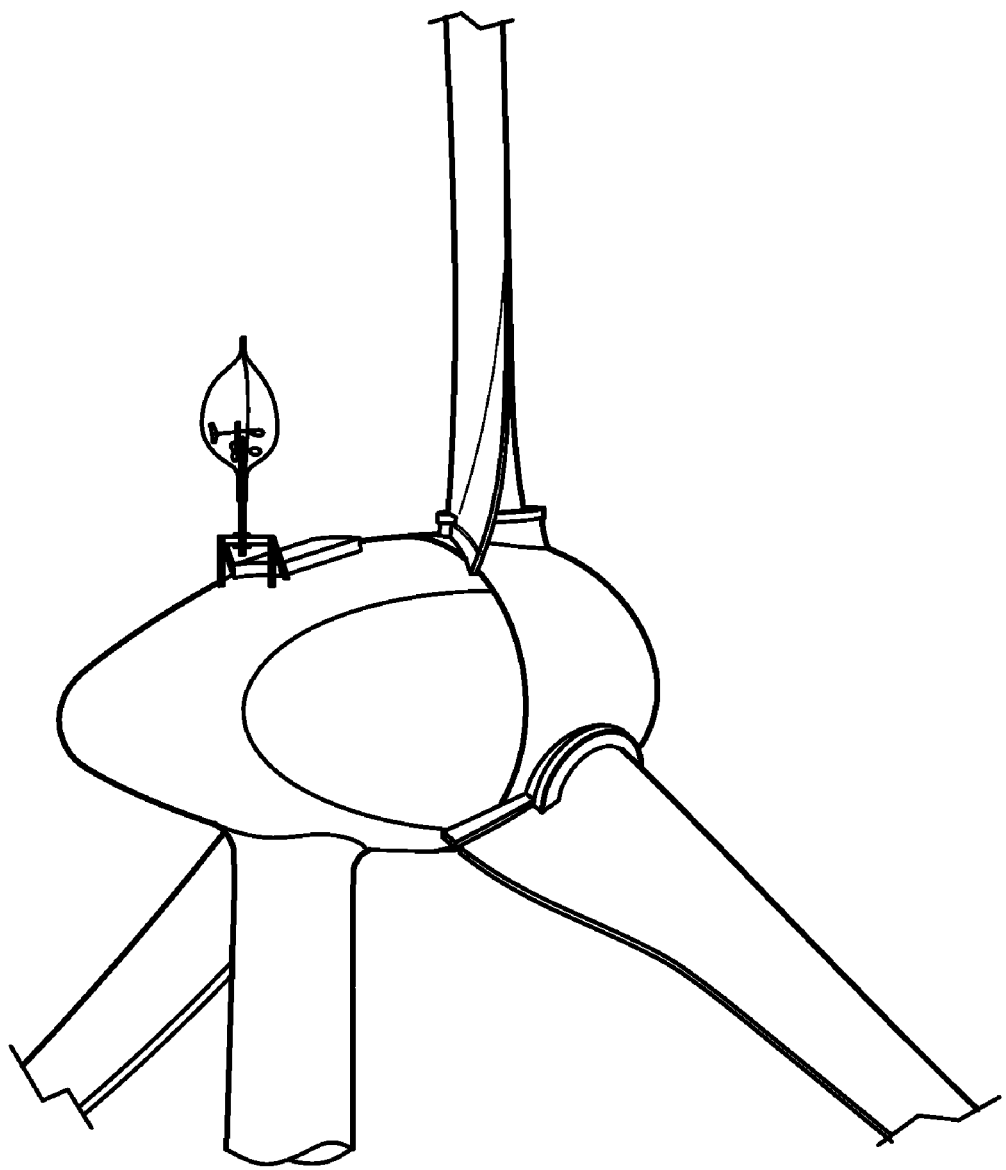

Once the wind increases beyond the nominal wind, the rotor blades are slowly adjusted out of the wind in conventional fashion by means of pitching (pitch regulation), wherein FIG. 15 shows that this can very well result in a gap of greater width being formed between the lower edge of the rotor blade in its inner region and the nacelle. However, FIG. 11 also shows that the outside of the nacelle contains a structure 30 whose cross section largely corresponds to the profile of the rotor blade in the region near the hub. This structure lies directly underneath the rotor blade at the nominal velocity when the rotor blade is adjusted to a the corresponding angle of attack such that only a narrow gap is formed between the structure and the rotor blade in the region near the hub.

Consequently, the outside contours of the nacelle also contains a section of the rotor blade that does not form an integral part with it.

In the rotor blade profile shown in FIG. 18, the tip radius is approximately 0.146 of the profile depth.

According to FIG. 18, the suction side contains a longer region that is nearly straight. For example, this region can be described as follows: in the region between 38% and 100% of the profile depth, the radius is 1.19-times the length of the profile depth. In the region between 40% and 85% of the profile depth (see FIG. 18), the radius is approximately 2.44 multiplied by the profile depth. In the region between 42 and 45% of the profile depth, the radius is approximately 5.56-times the profile depth.

In the region between 36% and 100% of the profile depth, the maximum deviation from an ideal straight line is approximately 0.012 of the profile length. This value is definitive because the radius of curvature varies and the maximum radius of curvature in the respective regions is already defined.

In the example shown, the length of the suction side is approximately 1.124-times the length of the profile depth, and the length of the pressure side is 1.112-times the length of the profile depth. This means that the suction side is only insignificantly longer than the pressure side. Consequently, it is very advantageous if the ratio between the length of the suction side and the length of the pressure side is smaller than 1.2, preferably smaller than 1.1, or lies in the range between 1 and 1.03.

The figures indicate that the rotor blade has its maximum profile depth directly at the spinner, i.e., on the outside of the nacelle of the wind power system. In a wind power system with a rotor diameter of 30 m, the profile depth at the spinner may be, for example, approximately 1.8 to 1.9, preferably 1.84 m. If the spinner has a diameter of approximately 3.2 m, the ratio between the profile depth of the rotor blade at the spinner and the spinner diameter is approximately 0.575. Therefore, it is highly advantageous if the ratio between the profile depth and the spinner diameter is higher than 0.4 or lies in the range between 0.5 and 1. In this respect, any value within the aforementioned range of values may be chosen. In the aforementioned example, the ratio between the profile depth and the rotor diameter is approximately 0.061. It is quite obvious that the resulting "slip hole" is minimized if the ratio between the profile depth and the rotor diameter is higher than a value between 0.05 and 0.01, where the example value proved highly advantageous with respect to the efficiency of the rotor blade.

In another example, the first third of a rotor blade has the profile cross section shown in FIG. 18, where the profile depth at the spinner lies at approximately 4.35 m, the spinner has a diameter of approximately 5.4 m and the rotor has an overall diameter of 71 m. In this case, the ratio between the profile depth and the spinner diameter is 0.806 and the ratio between the profile depth and the rotor diameter once again is 0.061. The above-cited values refer to a three-blade rotor with pitch regulation.

As mentioned above, the widest point of the rotor (the point of the rotor with the maximum profile depth) may be realized directly in the region of the blade mount. The term blade mount refers to the region in which the rotor blade is connected (joined, screwed, etc.) to the hub of the wind power system. In addition, the lower edge of the rotor blade, i.e., the edge that faces the nacelle of the wind power system, is adapted or largely follows the outside contours of the nacelle in the longitudinal direction. Consequently, a rotor blade in the feathered pitch position (practically no surface any longer aligned into the wind) lies parallel to the lower edge facing the nacelle and the distance between the lower edge and the outside contours of the nacelle is minimal, preferably less than 50 cm, particularly less than 20 cm.

If this rotor blade is now adjusted into the wind, it also has a surface of maximum size in the innermost region of the rotor blade (the slip hole is very small). The aforementioned citation by Erich Hau shows that the rotor blade according to the state of the art continuously decreases in the region near the hub (the rotor blades are narrower at this location than at their widest point). The widest point of the rotor blade according to the invention, in contrast, specifically lies in the region near the hub such that the wind potential can also be the fully utilized at this location.

It is well known that very large rotor blades, in particular, have a very large rotor blade width in the region near the hub. The rotor blade may also be composed of two parts in order to realize the transport of such rotor blades (the width of large rotor blades, i.e., rotor blades with a length in excess of 30 m, may very well lie between 5 m and 8 m in the region near the hub). The two parts are separated during transport and can be assembled after the rotor blade arrives at the installation site. The two parts are interconnected when the rotor blade is installed on the wind power system, for example, by means of screw connections or inseparable connections (bonding). This does not pose a problem, particularly with large rotor blades, because the interior of such rotor blades is also accessible during the assembly process. The outside of the rotor blade has a uniform appearance and separating lines between the assembled parts are barely visible or not visible at all.

Initial measurements demonstrated that the rotor blade design according to the invention makes it possible to significantly increase the efficiency in comparison with conventional rotor blades known thus far.

Figure 1:
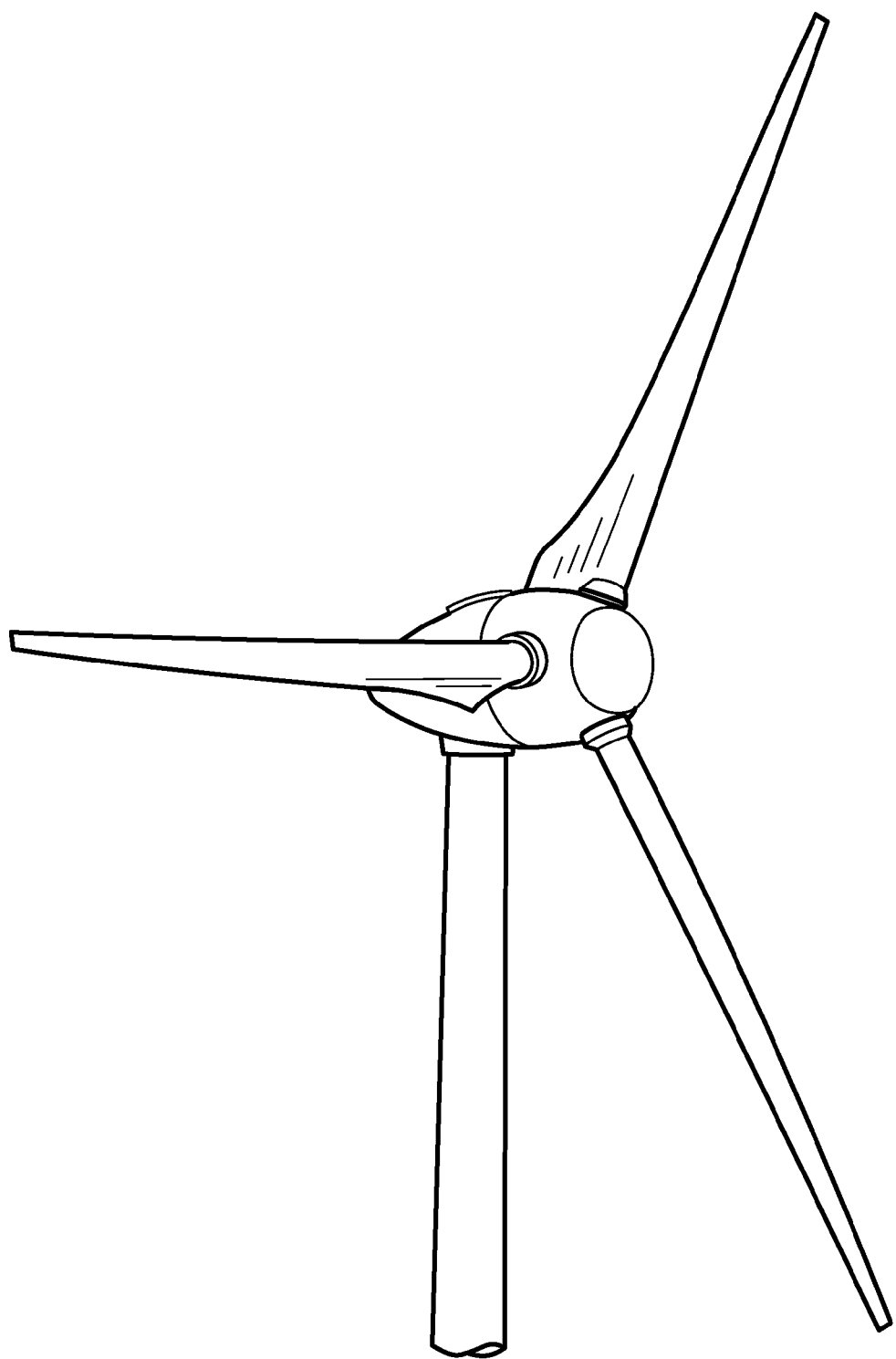
FIG. 1, a view of a wind power system according to the invention from a front perspective.
Figure 2:
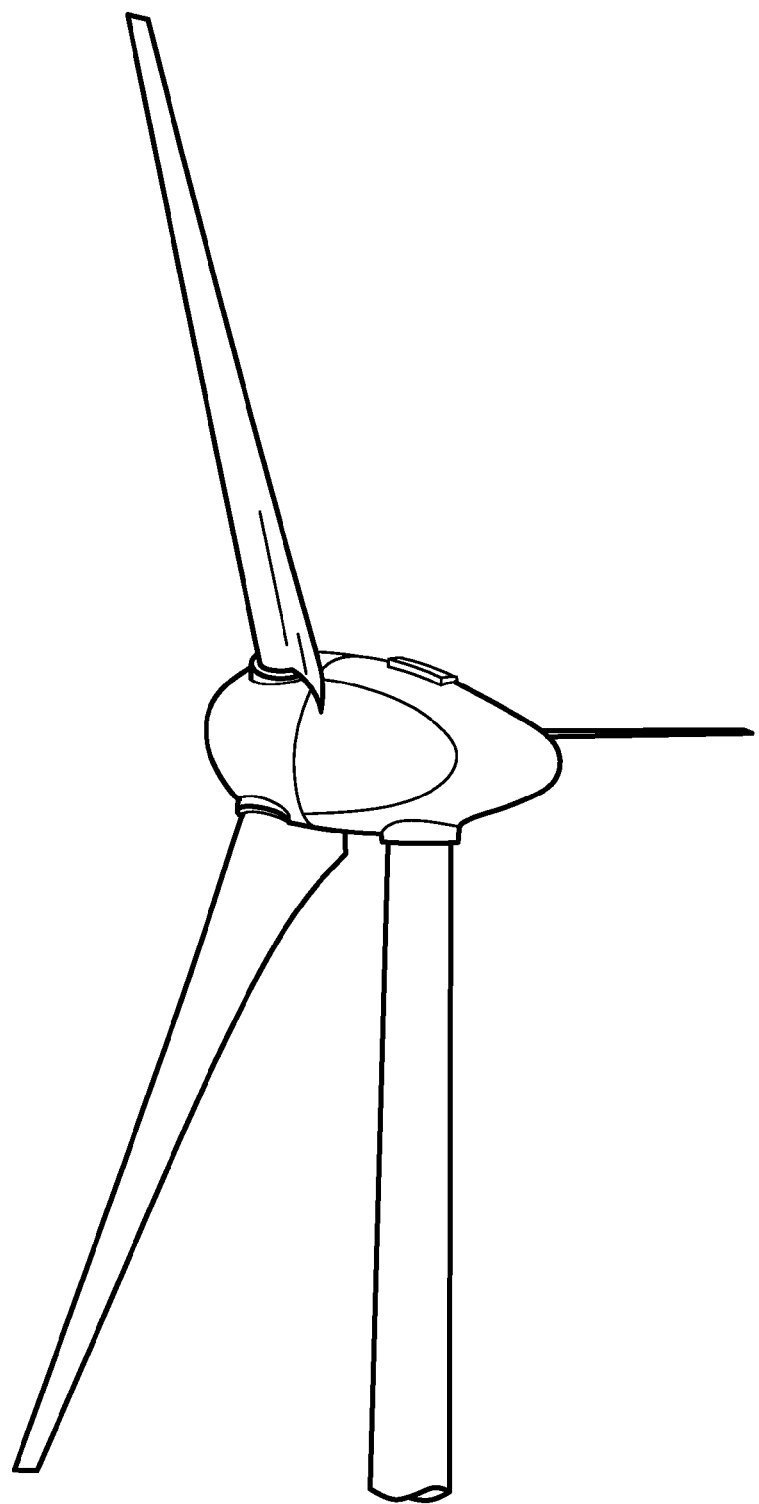
FIG. 2, a view of a wind power system according to the invention from a rear side perspective.
Figure 3:
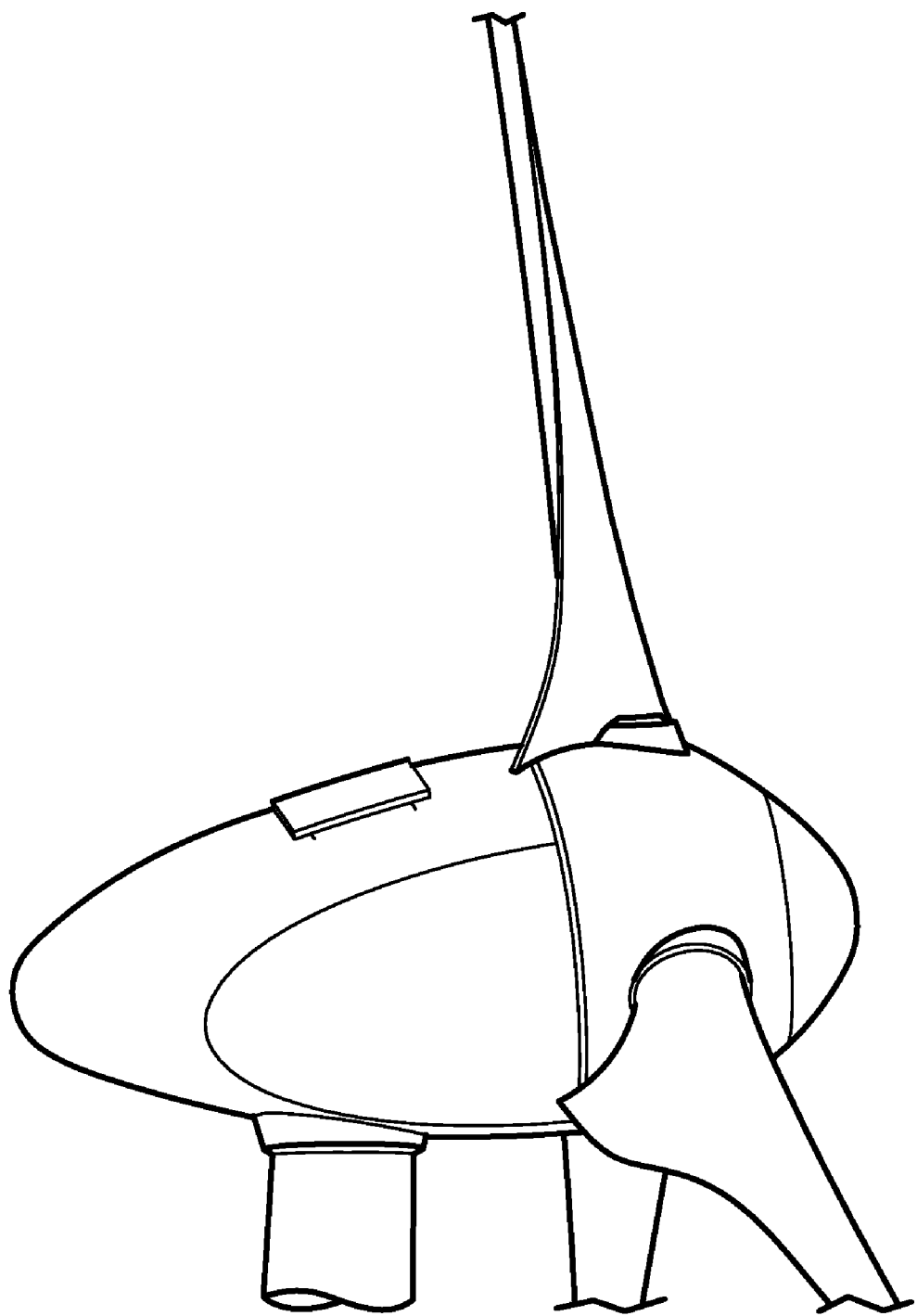
FIG. 3, a side view of a wind power system according to the invention.
Figure 7:
Figure 8:
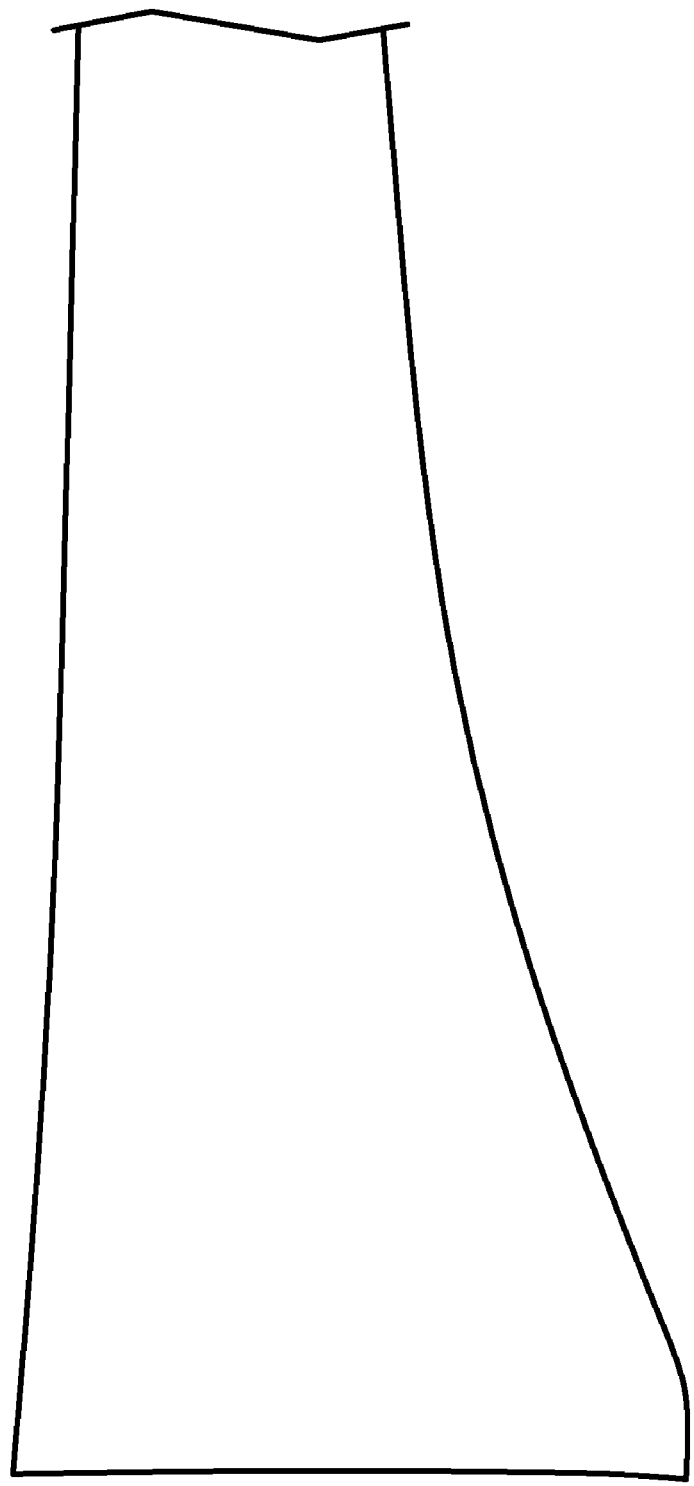
Figure 9:
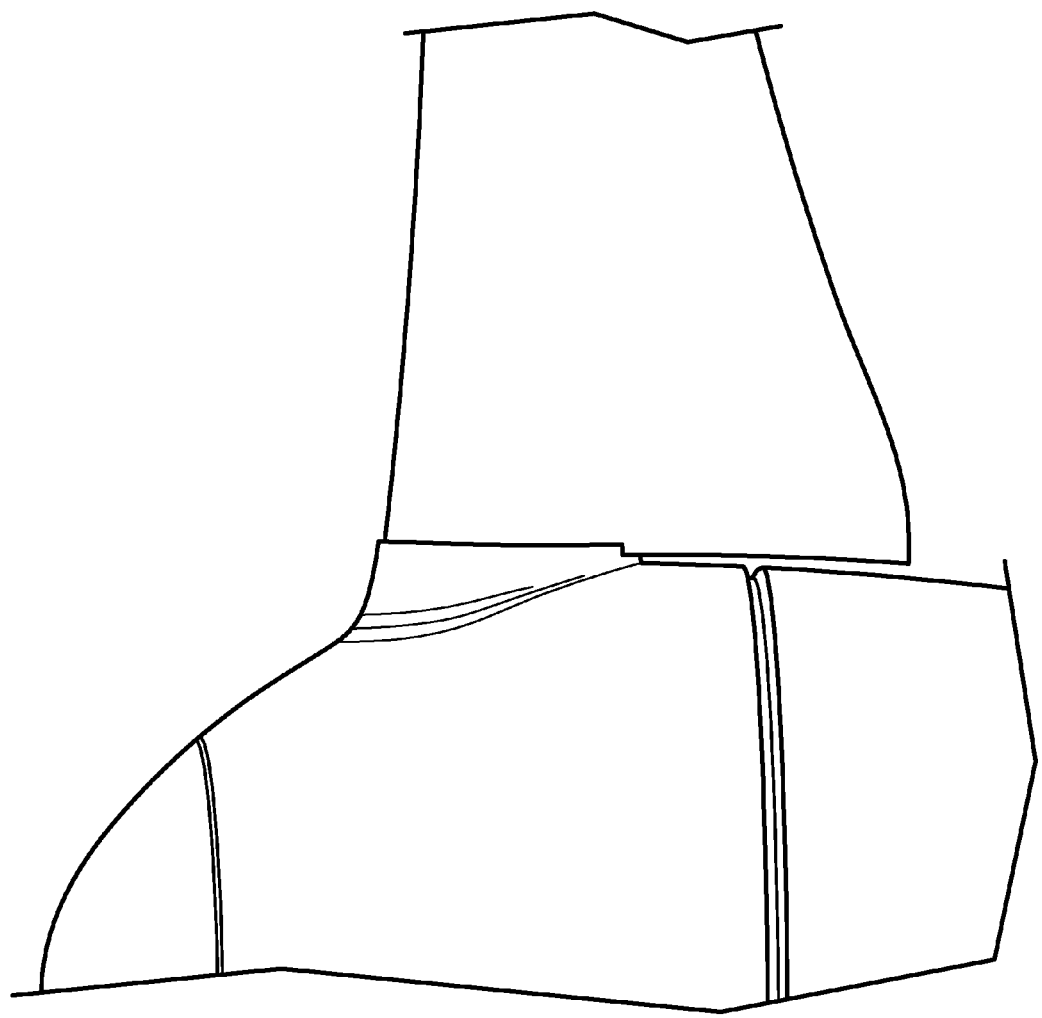
FIG. 9, an enlarged view of a wind power system according to the invention.
Figure 10:
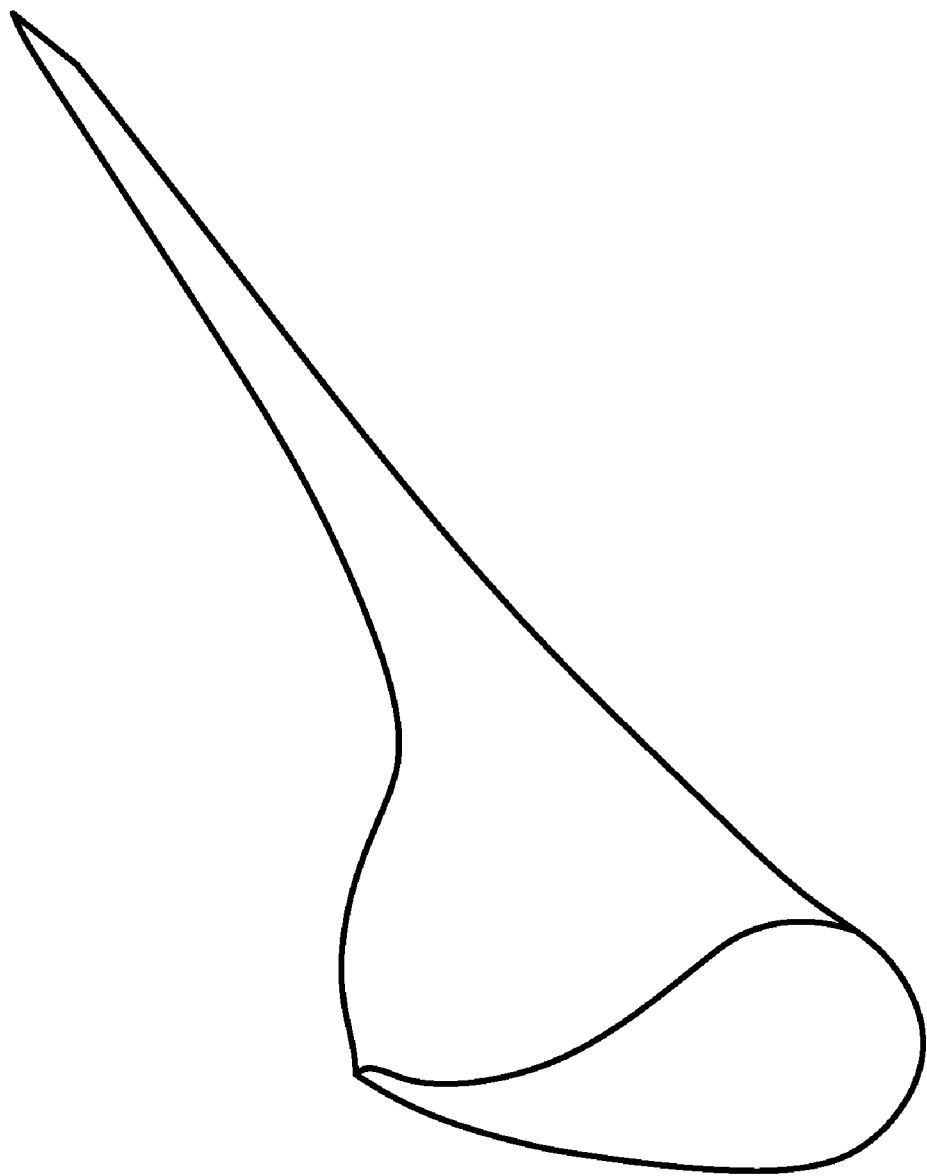
FIG. 10, a view of a rotor blade according to the invention.
Figure 11:
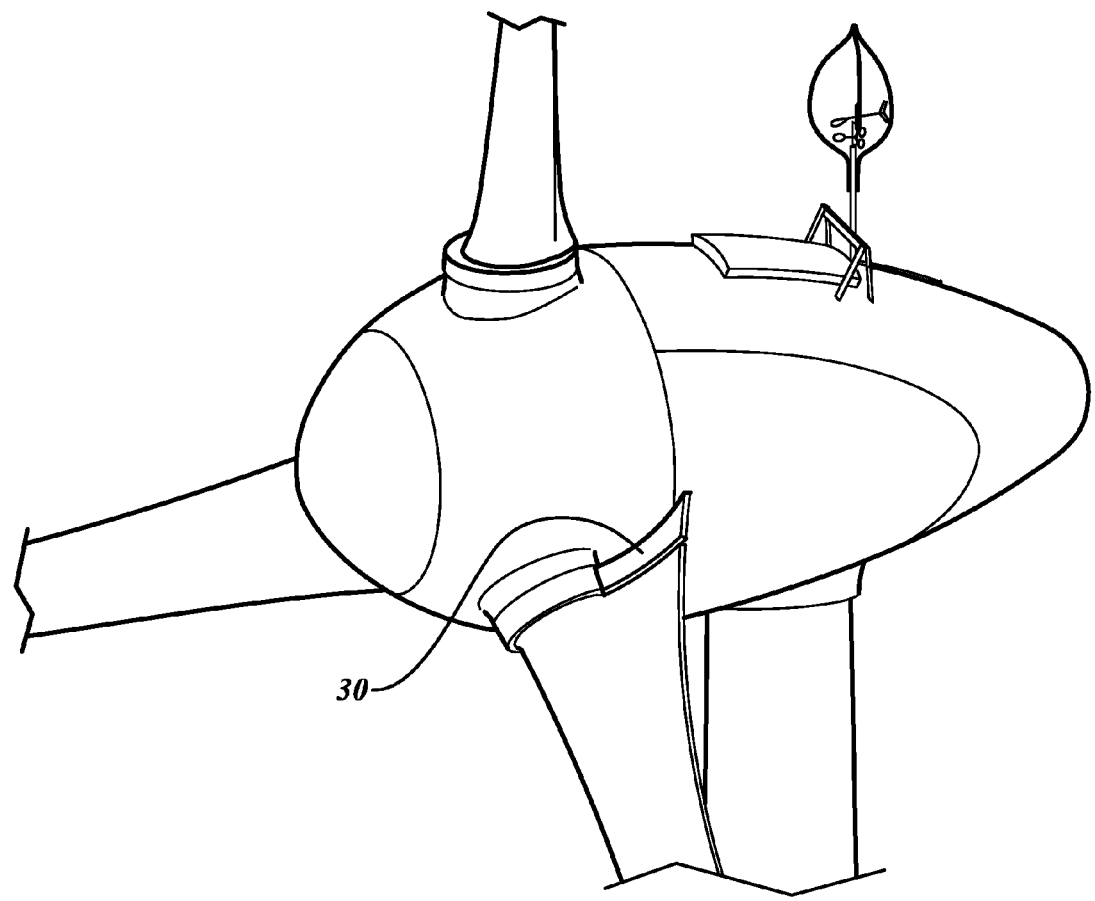
FIGS. 11-17, 19, different views of a wind power system according to the invention, and FIG. 18, a cross section through a rotor blade according to the invention (in the region near the hub).
Figure 12:
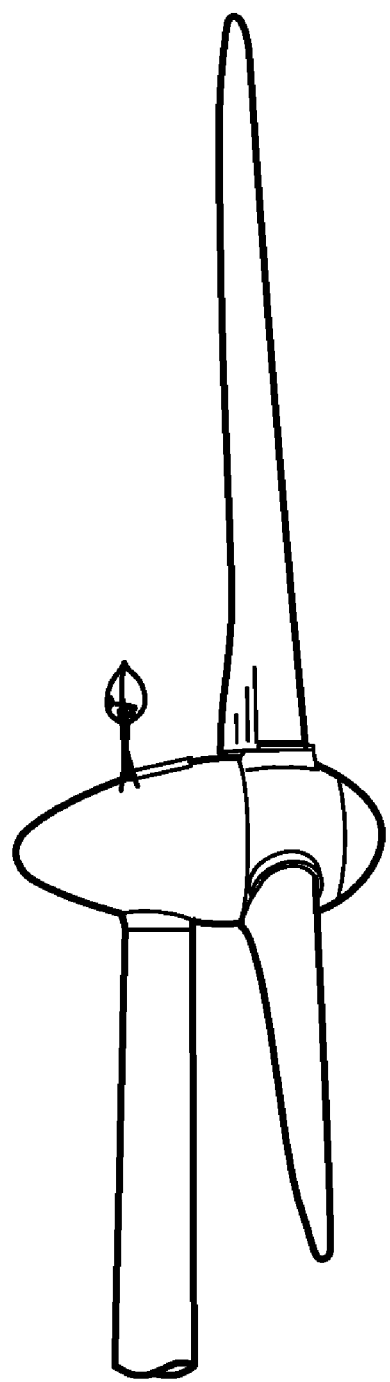
Figure 13:
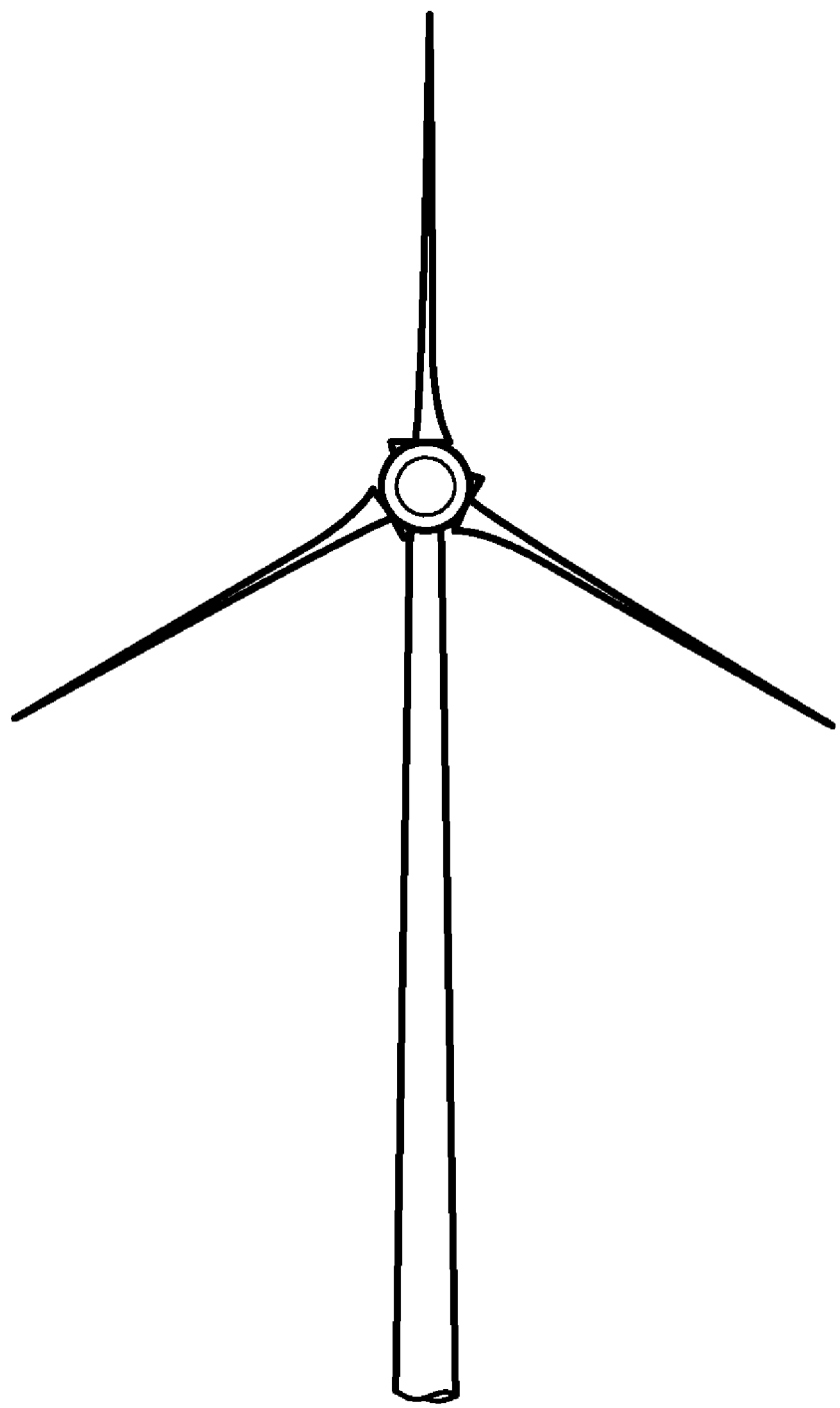
Figure 14:
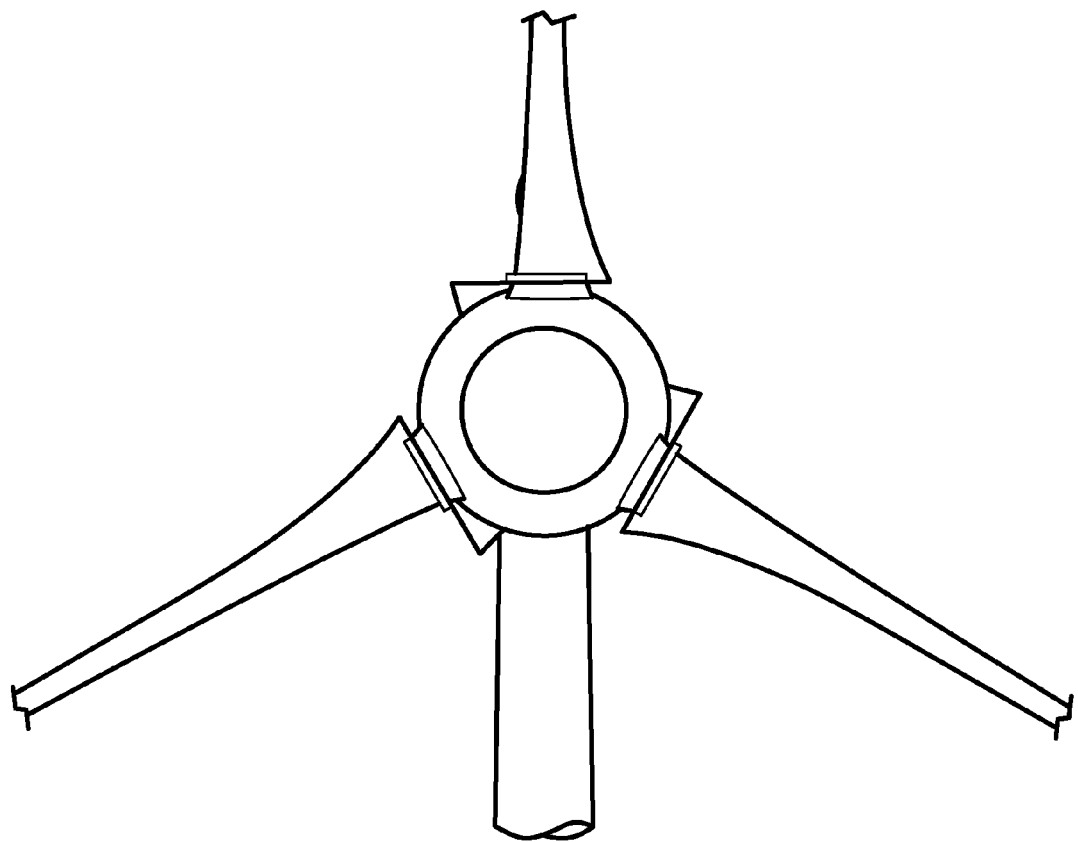
Figure 17:
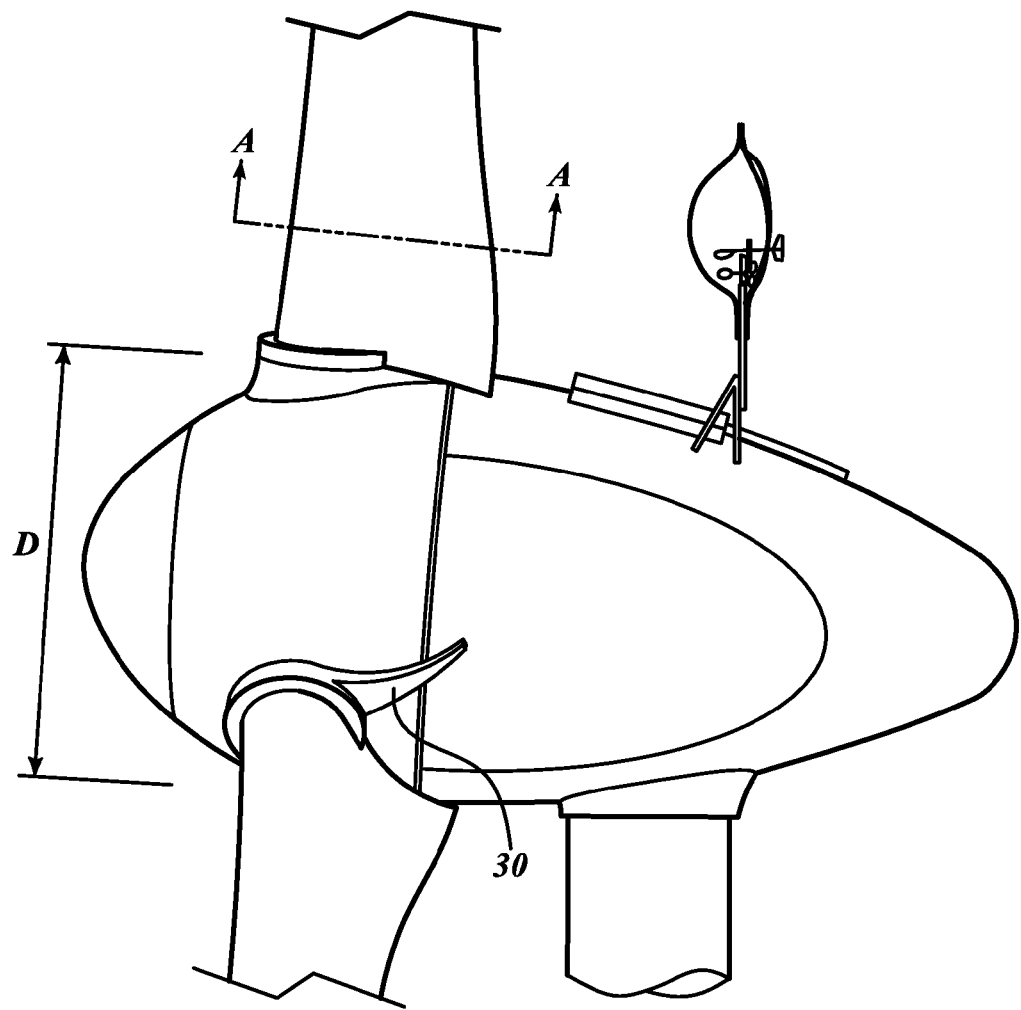

According to FIGS. 1-17, the rotor blades of a wind power system 1 according to the invention are realized such that they have their maximum profile depth in the region near the hub, and the rotor blades extend to location in the immediate vicinity of the nacelle fairing (spinner) of the power house of the wind power system along their entire profile in the region near the hub. This results in a very narrow gap between the rotor blade and the nacelle fairing, at least for the position in which the rotor blade is adjusted to an angle that corresponds to wind velocities up to the nominal wind range. In FIGS. 1, 2 and 3, for example, the rotor blades also extend to a location in the immediate vicinity of the outer nacelle fairing with the rear profile depth region. In an alternative variant that is illustrated, for example, in FIGS. 11-17, the outside nacelle fairing itself is provided with a rotor blade section 30 that, however, does not form an integral part of the entire rotor blade. FIGS. 15 and 17, in particular, show that the rotor blade part realized on the outside of the nacelle is fixed at this location and arranged at an angle that corresponds to the angular position of a rotor blade up to the nominal wind velocity. This means that only a minimal gap is also formed between the lower edge of the rotor blade and the nacelle in the rear profile depth region, at least at wind velocities up to the nominal wind.

Figure 19:
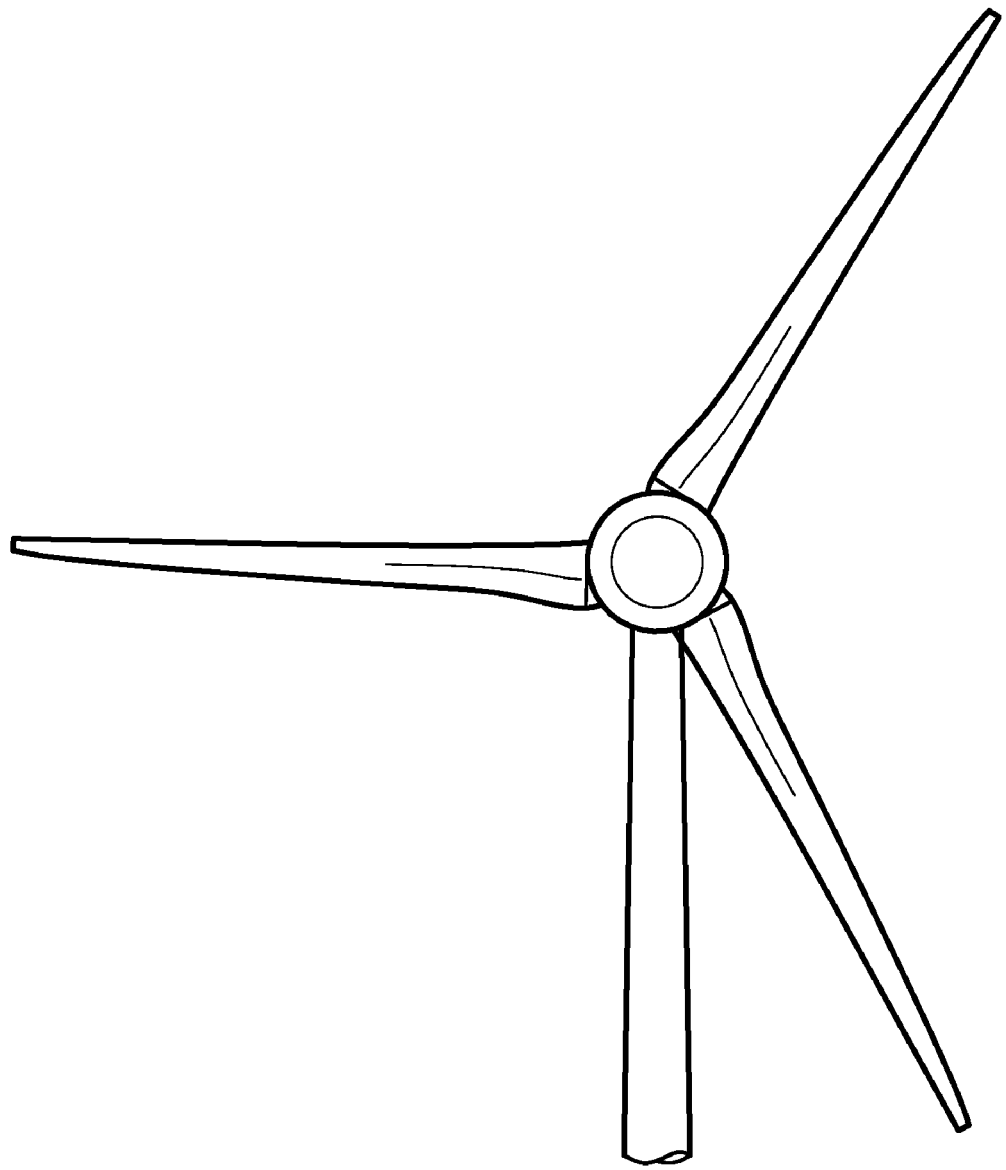

FIG. 19 also shows quite clearly that the design of the rotor blades in accordance with the invention results in a very small "slip hole" for the wind in the center of the rotor.

FIG. 18 shows a cross section through the rotor blade according to the invention along line A-A in FIG. 17, i.e., the profile of the rotor blade in the region near the hub.

FIG. 17 also contains an indication that refers to the diameter D of the spinner.

The rotor diameter is described by the diameter of the circular area swept by the rotor during its rotation.

According to FIG. 15 and other figures, the part 30 of the rotor blade does not form an integral part of the rotatable rotor blade, but rather an integral part of the outer nacelle fairing. The corresponding part may be screwed to the nacelle or be integrally connected or bonded to it.

Figure 21:
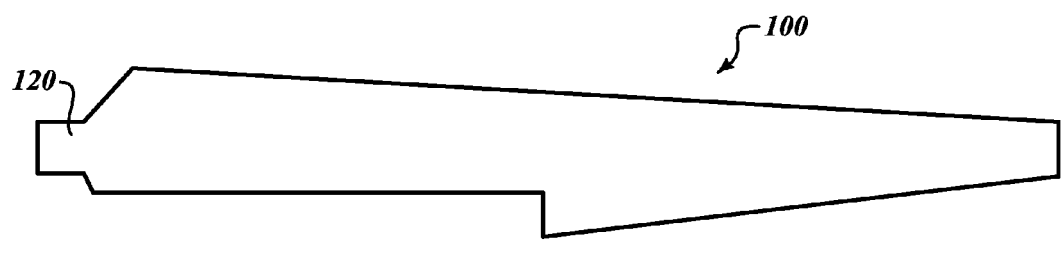
FIG. 21, a top view of the front section of a rotor blade according to the invention.

In instances in which the rotor blade according to the present application has a significant length and a corresponding rotor blade depth, i.e., blade chord, in the region near the hub, it may be practical to divide the blade into two (or more) parts in this region in order to simplify the transport of the rotor blade. In this case, the rotor blade is not reassembled until it reaches the installation site, at which the entire rotor blade is mounted on the hub. In such cases, part of the rotor blade may be realized, for example, as illustrated in FIG. 21. According to this figure, a section is missing in the rear blade edge region. The profile illustrated in FIG. 18 can be restored in this region by attaching the missing section.

The two parts can be interconnected by means of screws, bonding or other fastening methods.

It would also be conceivable to provide means for varying the size of the rotor blade surface in this region of the rotor blade. Corresponding variants are illustrated in FIGS. 22-33, where it should be noted that the rotor blade cross section illustrated in these figures should only be understood symbolically (the profile of the rotor blade essentially corresponds to the profile shown in FIG. 18).

The variants shown in FIGS. 22-33 provide the advantage that the overall rotor blade surface can be reduced, if so required. This is practical in extreme wind conditions as well as during the transport of the rotor blade because it allows or at least simplifies the transport of the rotor blade and protects the wind power system from overloads during extreme wind conditions.

In one particularly preferred variant of the invention, part of the surface consists of a deformable material that forms part of a closed receptacle (forming the rear profile box). This closed receptacle may be filled, for example, with a gaseous medium that is subjected to a predetermined pressure. This results in a partially inflatable surface of the rotor blade that can be evacuated during transport of the rotor blade or extreme wind conditions and therefore requires less space and yields to the wind pressure. This reduces the effective surface area of the rotor blade and therefore the surface of attack for the wind. The load on the downstream components including the tower is simultaneously reduced.

In another variant of the invention, the rotor blade contains a second airfoil structure in the region of the rear box (that is not illustrated in FIG. 21), wherein said airfoil structure can be moved on and/or in itself. The deformable material can be fixed at predetermined locations of this second airfoil structure, and one side of the deformable material can be fixed on a rotatable winding element.

The second airfoil structure can be extended in the normal operating mode of the wind power system, i.e., unfolding arms can be completely unfolded or telescopic arms can be completely extended. The deformable material may be fixed on a rotatable winding element with one side. If the surface area of the rotor blade surface must be reduced, the winding element is turned—analogous to an awning—such that the deformable material is wound up. The folding arms are simultaneously folded and reduce the size of the second airfoil structure in the region of the reducible surface such that the surface area of the rotor blade is reduced accordingly.

In an alternative variant of the invention, part of the rotor blade surface consists of lamellar strips that are respectively arranged on a support rail pivotable about its own longitudinal axis. In the normal operating mode, these lamellae are aligned such that they increase the aerodynamically effective surface area of the rotor blade. During transport of the rotor blade and/or under extreme loads, the support rails can be pivoted in such a way that the corresponding lamellae are moved, for example, into the wind shadow of the remaining rotor blade and the surface area of the rotor blade is reduced accordingly.

In one particularly preferred additional development of the invention, the movable part of the aerodynamically effective rotor blade surface consists of a separate planar element that can be displaced in the direction of the rotor blade depth. In normal operating mode, this planar element increases the surface area of the rotor blade, preferably on the suction side, in order to create a large aerodynamically effective surface area.

In order to reduce the surface area, this planar element can be displaced similar to the flap system of an aircraft wing, so that it is either displaced into the rotor blade and covered by the remaining surface of the rotor blade or displaced onto the rotor blade and covers its surface. In any case, this results in a reduction of the rotor blade surface area.

In an alternative variant of the invention, one side of this planar element is coupled to the first airfoil structure or the trailing edge of the rotor blade in a pivoted fashion. The surface area of the rotor blade can be varied by pivoting this element about its axis either toward the suction side or toward the pressure side of the rotor blade.

If this planar element is pivoted by approximately 90°, it stands essentially perpendicular to the direction of the air flow on the rotor blade and creates a corresponding deceleration effect because it forms an obstacle for the air flowing along the surface of the rotor blade.

Several variants of the invention are described in greater detail below with reference to the enclosed drawings.

Figure 20:
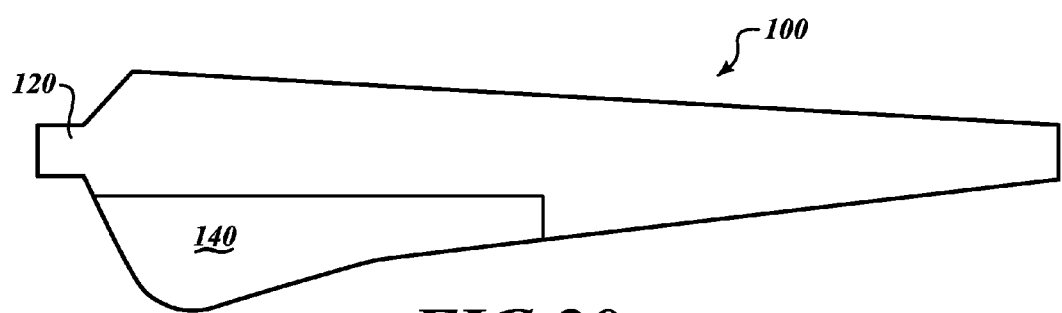
FIG. 20, a top view of a rotor blade according to the invention.

FIG. 20 shows a schematic top view of a complete rotor blade according to the invention. The rotor blade 100 is divided into two parts. With respect to its essential components, the rotor blade 100 is designed conventionally. However, a partition is visible in the region located adjacent to the rotor blade root 120, i.e., the region with the maximum blade depth. This partition marks the region 140 of the rotor blade 100, the surface area of which can be reduced, if so required, such that it is no longer subjected to the effect of the wind.

FIG. 21 shows the rigid part of the rotor blade 100, the surface area of which remains unchanged. This figure clearly shows that the aerodynamically effective surface area of the rotor blade 100 is significantly reduced such that the load, particularly in extreme wind situations, is much lower than that of a conventionally designed rotor blade.

Figure 22:
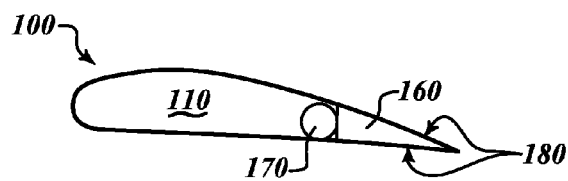
FIG. 22, a schematic cross section through a first variant of a rotor blade according to the invention.

FIG. 22 shows a schematic cross section through a first variant of the invention. In this case, the rotor blade 100 is divided into a front region 110 and a rear box 140. This rear box 140 consists of two strips of a deformable material 180 that form a closed receptacle 160 together with the rear wall of the front region 110. If this closed receptacle 160 is now filled with a pressurized gaseous medium, the deformable material 180 forms part of the surface area of the rotor blade 100 according to the invention that is aerodynamically effective in the normal operating mode (and identified by the reference symbol 140 in FIG. 20).

This section of the rotor blade 100 can be realized with such a stability that its normal effect becomes evident under normal wind conditions. However, the wind pressure exerted upon this part of the rotor blade 100 is higher in extreme wind situation such that the external pressure is higher than the internal pressure, whereby the rotor blade is deformed in the region of the rear box 140 in such instances and the rotor blade ultimately yields to the external wind pressure. This not only reduces the surface of attack for this extreme wind, but also the loads on the downstream structure.

It should also be noted that this part of the rear box (in which the filling medium is accommodated) can be actively evacuated in order to reduce the surface area of the rotor blade, for example, when a predetermined wind velocity is exceeded. This active evacuation provides the advantage that the shape of the rotor blade is defined at all times while uncertain situations may arise if the rear box yields to the external pressure.

In order to prevent damage to the receptacle 160, it would be possible, for example, to provide a (not-shown) pressure relief valve that allows excess pressure being built up in the receptacle 160 to escape.

The pressure required for the normal operating mode can be restored by utilizing a compressor 170. If (not-shown) control valves and/or pressure sensors are provided, the pressure in the receptacle 160 can also be adjusted if the wind pressure fluctuates such that optimal operating conditions are always maintained.

Figure 23:
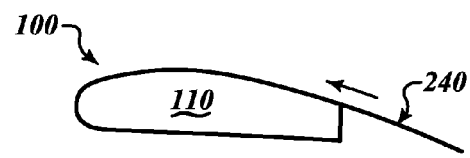
FIG. 23, a schematic cross section through a second variant of the rotor blade according to the invention.

FIG. 23 shows a second variant of the present invention, in which the surface on the suction side of the rotor blade 100 is extended rather than utilizing a complete rear box 140. This extension consists of a planar element 240 that lies adjacent to the surface of the front region 110.

This planar element 240 can be displaced in the direction indicated by the arrow in order to reduce the aerodynamically effective surface area. This displacement can be realized, for example, hydraulically with corresponding hydraulic cylinders, pneumatically with pneumatic cylinders, with electric drive systems or the like. Naturally, corresponding pumps, compressors or drives (actuators) must be provided for this purpose (but are not illustrated in the figure in order to provide a better overview).

The planar element may be displaced into the front region such that the surface of the front region 110 covers the planar element 240. Alternatively, the planar element may also be displaced onto the surface of the front region 110 such that the surface element 240 covers the corresponding surface area of the front region 110. The aerodynamically effective surface area of the rotor blade 100 is reduced in the both instances.

Figure 24A:
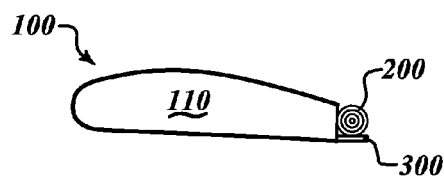
FIGS. 24a, 24b, schematic cross sections through a third variant of the rotor blade according to the invention.
Figure 24B:
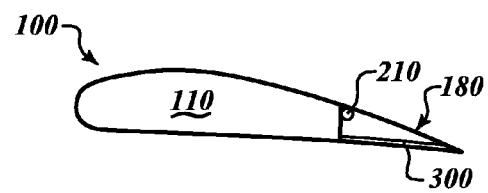

FIGS. 24a and 24b show a third variant of the present invention. FIG. 24a shows a reel 200 of a deformable material, and the reference symbol 300 designates folding arms that are illustrated in the folded state. This mechanism may be realized similarly to that of an awning.

FIG. 24b shows this variant in normal operating mode. The folding arms 300 are extended and the deformable material 180 fixed thereon was unwound from the reel 200 during the extension of the folding arms 300. Consequently, the reel core 210 no longer carries the entire wound-up material.

In this unwound state, the deformable material 180 is fixed on the reel core 210 with one side and on the ends of the folding arms 300 that point toward the right in the figure with the other side. The ends of the folding arms 300 may be connected to a not-shown web in order to increase the rigidity of the construction and to fix the deformable material in position.

In order to prevent the deformable material 180 from becoming slack between the reel core 210 and the outer ends of the folding arms 300, a (not-shown) device similar to an adjustable grate may be provided underneath the deformable material 180, which grate is actuated synchronously with the folding arms 30 and supports the deformable material 180 in the extended state.

The effective surface area is reduced by reversing this sequence; the folding arms 300 and the (not-shown) adjustable grate a retracted (folded) and the deformable material 180 is simultaneously wound on the reel core 210. This ultimately results in the reel 200 illustrated in FIG. 24a and a reduced effective surface area of the rotor blade 100.

Figure 25:
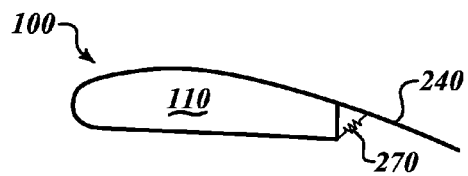
FIG. 25, a schematic cross section through a fourth variant of a rotor blade according to the invention.

In the fourth variant of the invention shown in FIG. 25, the planar element 240 is coupled in a pivoted fashion to the rear side of the front region 110 such that it forms an extension of the suction side of this front region 110.

In this case, the planar element 240 is supported by a compression spring 270 that is arranged between the planar element 240 and the supporting structure of the front region 110.

In the normal operating mode, this compression spring 270 supports the planar element 240 in such a way that it maintains the desired position. If an abnormal wind pressure acts upon the upper side of the rotor blade 100, the pressure exerted upon the surface of the planar element 240 increases and overcomes the force of the spring 270 such that the planar element 240 shown in FIG. 25 is pressed downward and yields to the wind pressure. This results in a corresponding reduction of the aerodynamically effective surface area.

Instead of using a spring 270, it would also be possible to provide corresponding telescopic elements for actively adjusting the planar element, e.g., hydraulic or pneumatic devices or mechanical devices. It would also be possible, for example, to utilize threaded rods and worm drives or the like in order to hold the planar element 240 in a first predetermined position or to displace the planar element into a second predetermined position. Naturally, corresponding pumps, compressors or drives that are not illustrated in this figure in order to provide a better overview also must be provided in order to operate these actuators.

The wind load acting upon the planar element 240 can also be determined in this case, where the planar element 240 is pivoted about the pivoting axis as a function of the measured wind load in order to optimally adjust the planar element in accordance with the instantaneous operating conditions.

Figure 26:
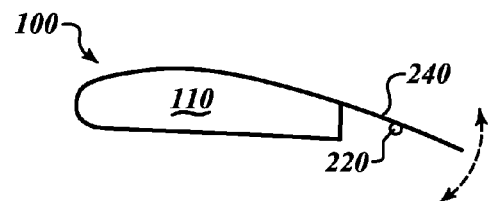
FIG. 26, a schematic cross section through a fifth variant of a rotor blade according to the invention.

FIG. 26 shows a fifth variant of the invention. In this fifth variant, the planar element 240 is not coupled in pivoted fashion to the rear side of the front region 110, but rather is arranged on a hinge pin 220 that can be turned about its own longitudinal axis. In the position shown in FIG. 26, the planar element 24 forms an extension of the aerodynamically effective surface area of the rotor blade 100.

In order to reduce this surface area, the hinge pin 220 with the planar element 240 fixed thereon is turned about its longitudinal axis in such a way that the outer end of the planar element 240 moves in one of the two directions indicated by the double arrow. This also leads to a reduction of the aerodynamically effective surface area of the rotor blade 100 and therefore to a change of the wind load acting upon the rotor blade 100 and all downstream components of the wind power system.

Figure 27A:
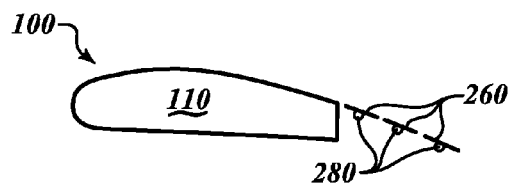
FIGS. 27a, 27b, simplified cross sections through a sixth variant of a rotor blade according to the invention.
Figure 27B:
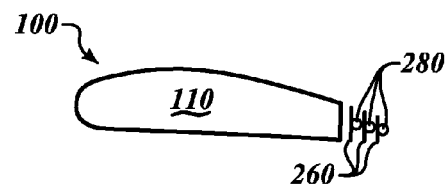
Figure 28A:
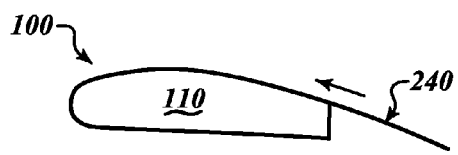
FIG. 28a-28b, a top view of one constructive variant of a rotor blade according to the invention, and FIGS. 29a-33, other advantageous examples of the invention.
Figure 28B:
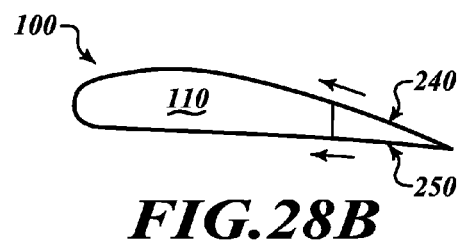
Figure 29A:
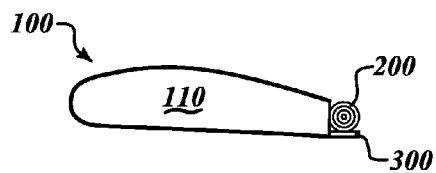
Figure 29B:
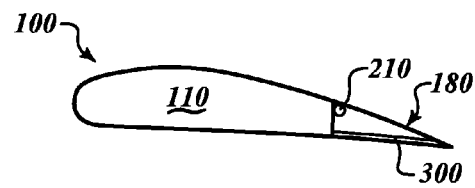

FIGS. 27a and 27b show a modification of the embodiment shown in FIG. 26. The planar element identified by the reference symbol 240 in FIG. 26 is divided into three lamellar elements 260 in FIG. 27a. These lamellar elements are intentionally spaced apart in FIG. 27a in order to elucidate this division. Naturally, these three elements are actually arranged in such a way that they form a largely closed surface that transitions into the front region 110 of the rotor blade 100 as smoothly as possible.

Each lamella 260 is arranged on its own hinge pin. Each hinge pin 280 can be turned about its own longitudinal axis, whereby the respective lamellae 260 are pivoted by turning the hinge pin 280 about the longitudinal axis.

FIG. 27b shows a device according to the invention in a situation in which these lamellae are pivoted into such a position that they reduce the aerodynamically effective surface area of the rotor blade 100. The lamellae 260 are pivoted into the wind shadow of the front region 110 in this case.

Thus, the lamellae no longer form part of the rotor blade surface area such that they are no longer subjected to the wind and therefore any elevated loads.

Such an arrangement is realized in that the distance between the left hinge pin 280 in the figure and the front region 110 of the rotor blade 100 and the mutual distances between the hinge pins 280 are reduced in addition to the turning of the hinge pins 280 about their longitudinal axes.

Although only an extension of the surface area on the suction side is illustrated in the figures, it would naturally also be possible to alternatively or additionally vary the size of the surface area on the pressure side.

If a wind power system is equipped with the above-described rotor blades and an extreme wind situation occurs, it is possible not only to determine the high wind force with the aid of wind velocity indicators, but also to reduce significantly the size of the rotor blade surface area with the aid of a corresponding control arrangement. According to FIGS. 20 and 21, the surface area of the rotor blade shown in FIG. 20 is larger than the surface area of the rotor blade shown in FIG. 21 by more than 10%. The rotor blade is adjusted to its normal size when the wind power system operates in normal mode, for example, at wind velocities between 2-20 m/s. Once the wind velocity increases to a value above 20 m/s, the surface area can be reduced such that its size decreases significantly—as shown in FIG. 21.

The control arrangement is preferably realized in a computer-assisted fashion and ensures that the respectively optimal size of the rotor blade surface area is adjusted, if so required.

Figure 33:
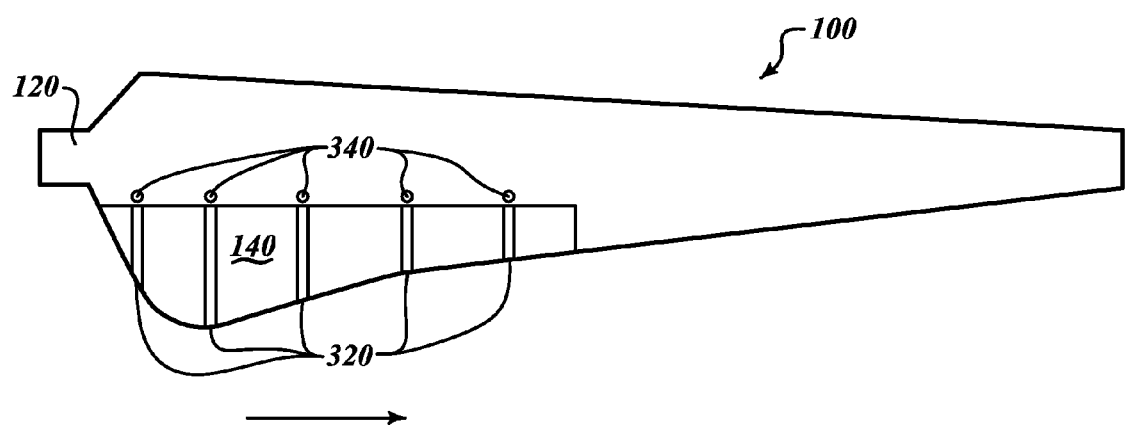

FIG. 33 shows another variant of a rotor blade according to the invention. In this case, the structure is composed of pivoted hoops 320 that are covered with a deformable film and pivotally supported in bearing points 340. During a movement in the direction of the rotor blade tip (arrow), these hoops are pivoted, for example, about the bearing points 340 such that the rear box profile is changed.

FIGS. 28-32 show other alternative and supplementary variants of FIGS. 22-27b.

Figure 30A:
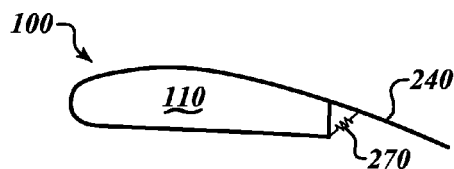
Figure 30B:
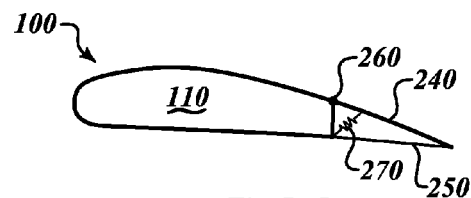

FIG. 30b (FIG. 30a essentially corresponds to FIG. 25) shows a modification of FIG. 25 that is provided with a supplementary element 250 on the pressure side. Since the point of contact of the spring 270 was not changed in relation to FIGS. 25 and 30a, respectively, the elements 240 and 250 must be connected on the trailing blade edge such that they can be pivoted about a coupling point 260. Under certain circumstances, it would be possible to realize the rotor blade box 110 so that it overlaps the element 250 along the length of the rotor blade in this variant.

Figure 31A:
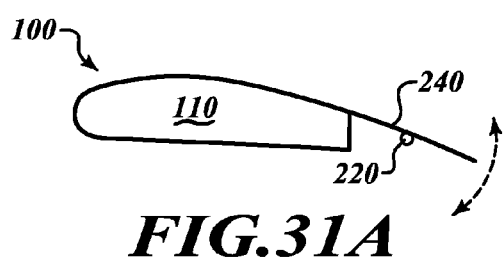
Figure 31B:
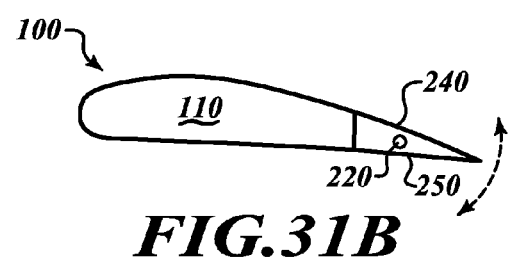

FIG. 31b (an expanded variant of FIGS. 26 and 31a, respectively) also shows an element 250 on the pressure side that is connected to the same shaft 220 as the element 240 on the suction side via a mechanical connection.

Figure 32A:
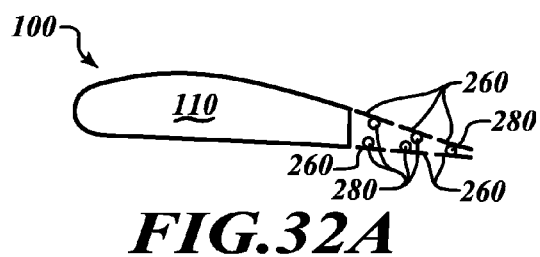
Figure 32B:
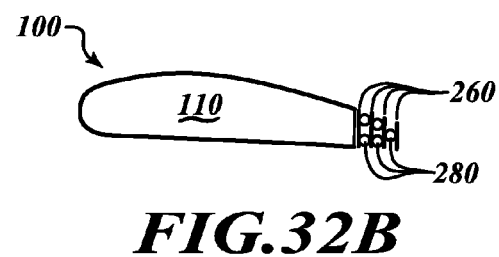

FIGS. 32a and 32b show an additional development of the variant according to FIGS. 27a and 27b. In this case, separate shafts 280 are provided for corresponding elements on the pressure side. Analogous to FIG. 27a, FIG. 32a shows a rotor blade in normal operating mode. FIG. 32b shows a situation in which the rear box is rendered ineffective by rotating or displacing the shaft 280 accordingly.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Although specific embodiments of and examples are described herein for illustrative purposes, various equivalent modifications can be made without departing from the spirit and scope of the invention, as will be recognized by those skilled in the relevant art after reviewing the specification. The various embodiments described above can be combined to provide further embodiments. Aspects of the embodiments can be modified, if necessary, to employ systems, circuits and concepts of the various patents, applications and publications owned by the assignee of the present application (and/or by others) to provide yet further embodiments.

These and other changes can be made to the embodiments in light of the above-detailed description. In general, in the following claims, the terms used should not be construed to limit the invention to the specific embodiments disclosed in the specification, Abstract, and the claims. Accordingly, the invention is not limited by the disclosure, but instead its scope is to be determined entirely by the following claims, which are to be construed in accordance with established doctrines of patent claim interpretation.

The invention claimed is:

1. A rotor blade for a wind power system having a cross section located in a region adjacent a rotor blade mount location, wherein a position of maximum thickness of the cross section of the rotor blade lies approximately between 15% and 40% of a chord length of the cross section, wherein a maximum profile thickness of the cross section is approximately between 20% and 45% of the chord length, and wherein, in a region immediately adjacent the rotor blade mount location, a width of the rotor blade continuously decreases with increasing radial distance from the rotor blade mount location, and wherein a ratio between a maximum chord length of the rotor blade and a rotor diameter of the wind power system is between approximately 0.04 and 0.1.

2. The rotor blade according to claim 1 wherein the cross section of the rotor blade is described by a skeleton line, a maximum camber of which lies between 50% and 70% of the chord length.

3. The rotor blade according to claim 2 wherein the maximum camber is approximately 3%-10% of the chord length.

4. The rotor blade according to claim 1 wherein the rotor blade has a pressure side and a suction side, wherein the pressure side contains a section with a concave camber and a nearly straight section is realized on the suction side.

5. The rotor blade according to claim 1 wherein the rotor blade includes a first part and a second part in a lower section of the rotor blade, the first part larger than the second part, and wherein the rotor blade includes a mechanism for varying a size of the rotor blade surface.

6. A wind power system comprising:
a rotor blade hub; and
at least one rotor blade coupled to the rotor blade hub at a rotor blade mount location, wherein the rotor blade includes a maximum chord length proximate the rotor blade mount location, wherein a ratio between the maximum chord length and a rotor diameter of the rotor blade is between approximately 0.04 and 0.1, and wherein a width of the rotor blade continuously decreases with increasing radial distance from the rotor blade mount location.

7. The wind power system according to claim 6, further comprising:
a rotor blade base structure separate from the rotor blade and fixedly connected to the rotor blade hub, and wherein a profile of the rotor blade base structure essentially corresponds to a profile of the rotor blade in a region near the rotor blade mount location.

8. The wind power system according to claim 7 wherein the profile of the rotor blade base structure is aligned to be directly underneath the profile of the rotor blade if a wind velocity is below a nominal wind velocity and the rotor blade is adjusted to a position for the nominal wind velocity.

9. A wind power system, comprising:
a rotor blade mount; and
at least one rotor blade having a cross section, wherein a position of maximum thickness of the cross section of the rotor blade lies approximately between 15% and 40% of a chord length of the cross section, wherein a maximum profile thickness of the cross section is approximately between 20% and 45% of the chord length, wherein the cross section is positioned adjacent to the rotor blade mount and includes a maximum chord length of the rotor blade, wherein a ratio between the maximum chord length and a rotor diameter is between approximately 0.04 and 0.1, and wherein, in a region immediately adjacent the rotor blade mount, a width of the rotor blade continuously decreases with increasing radial distance from the rotor blade mount.

10. The wind power system according to claim 9, further comprising:
a rotor blade hub provided with a spinner, and wherein a ratio between the maximum chord length of the rotor blade and a diameter of the spinner is greater than 0.4.

11. The wind power system according to claim 9, further comprising:
a nacelle, and wherein a lower edge of the rotor blade that faces the nacelle is configured to essentially follow outside contours of the nacelle in a longitudinal direction.

12. The wind power system according to claim 11 wherein the lower edge of the rotor blade that faces the nacelle lies nearly parallel to an outside contour of the nacelle when the rotor blade is turned into a feathered pitch position.

13. The wind power system according to claim 12 wherein a distance between the lower edge of the rotor blade that faces the nacelle and the outside contour of the nacelle is less than 50 cm in the feathered pitch position.

14. The wind power system according to claim 11 wherein the rotor blade is tilted out of a principal plane of the rotor blade in a root region of the rotor blade.

15. The wind power system according to claim 11 wherein the rotor blade is configured in two parts in a root region of the rotor blade, and wherein a partition line is oriented in a longitudinal direction of the rotor blade.

16. The wind power system according to claim 15 wherein the two parts of the rotor blade are not assembled until installation of the rotor blade into the wind power system.

17. The wind power system according to claim 15 wherein the two parts of the rotor blade remain separated during transport.

18. The wind power system according to claim 9 wherein the at least one rotor blade includes a suction side and a pressure side, wherein a ratio between a length of the suction side and a length of the pressure side is smaller than 1.2.

19. The wind power system of claim 9 wherein the position of maximum thickness of the cross section of the rotor blade lies approximately between 23% and 28% of the chord length, and wherein the maximum profile thickness is approximately between 32% and 36% of the chord length.

20. The wind power system according to claim 9 wherein the rotor blade includes a first part and a second part in a lower section of the rotor blade, the first part larger than the second part, and wherein the rotor blade includes a mechanism for varying a size of the rotor blade surface.

21. An apparatus, comprising:
a rotor blade for a wind power system having a cross section, wherein a position of maximum thickness of the cross section of the rotor blade lies approximately between 15% and 40% of a chord length of the cross section, and wherein a maximum profile thickness of the cross section is approximately between 20% and 45% of the chord length; and a rotor coupled to the at least one rotor blade at a rotor blade mount location, wherein, in a region immediately adjacent the rotor blade mount location, a width of the rotor blade continuously decreases with increasing radial distance from the rotor blade mount location, and wherein a ratio between a maximum chord length and a rotor diameter is between approximately 0.04 and 0.1.

22. The apparatus according to claim 21 wherein the rotor blade includes a first part and a second part in a lower section of the rotor blade, the first part larger than the second part, and wherein the rotor blade includes a mechanism for varying a size of the rotor blade surface.

* * * * *